(12) United States Patent
Chaturvedi et al.

(10) Patent No.: US 9,491,233 B2
(45) Date of Patent: *Nov. 8, 2016

(54) SYSTEM AND METHOD FOR PROVIDING ADDITIONAL FUNCTIONALITY TO EXISTING SOFTWARE IN AN INTEGRATED MANNER

(71) Applicant: DAMAKA, INC., Richardson, TX (US)

(72) Inventors: Sivakumar Chaturvedi, Allen, TX (US); Satish Gundabathula, Irving, TX (US); Rashmi Hiremath, Allen, TX (US)

(73) Assignee: DAMAKA, INC., Richardson, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/049,891

(22) Filed: Feb. 22, 2016

(65) Prior Publication Data
US 2016/0173577 A1   Jun. 16, 2016

Related U.S. Application Data

(63) Continuation of application No. 14/690,619, filed on Apr. 20, 2015, now Pat. No. 9,270,744, which is a continuation of application No. 14/024,027, filed on Sep. 11, 2013, now Pat. No. 9,027,032.

(60) Provisional application No. 61/846,958, filed on Jul. 16, 2013.

(51) Int. Cl.
*G06F 3/00* (2006.01)
*G06F 9/44* (2006.01)
(Continued)

(52) U.S. Cl.
CPC ............ *H04L 67/10* (2013.01); *G06F 15/167* (2013.01); *H04L 65/1069* (2013.01); *H04L 65/1089* (2013.01)

(58) Field of Classification Search
None
See application file for complete search history.

(56) References Cited

U.S. PATENT DOCUMENTS 5,442,637 A   8/1995   Nguyen
5,761,309 A   6/1998   Ohashi et al.
(Continued)

FOREIGN PATENT DOCUMENTS

EP   1404082 A2   3/2004
EP    160339 A1  12/2005
(Continued)

OTHER PUBLICATIONS

International Search Report and Written Opinion of the International Searching Authority from PCT/US2006/040312, dated Mar. 2, 2007.
(Continued)

*Primary Examiner* — Craig Dorais
(74) *Attorney, Agent, or Firm* — Howison & Arnott, LLP

(57) ABSTRACT

An improved system and method are disclosed for improving functionality in software applications. In one example, the method includes a mobile device having a network interface, a processor, and a memory configured to store a plurality of instructions. The instructions include instructions for a superblock application having instructions for a function block included therein. The function block is configured to provide functions that are accessible to the superblock application via an application programming interface (API). The functions are provided within the superblock application itself and are accessible within the superblock application without switching context to another application on the mobile device.

20 Claims, 12 Drawing Sheets

(51) Int. Cl.
  *G06F 9/46*   (2006.01)
  *G06F 13/00*  (2006.01)
  *H04L 29/08*  (2006.01)
  *H04L 29/06*  (2006.01)
  *G06F 15/167* (2006.01)

(56) References Cited

U.S. PATENT DOCUMENTS

| | | |
|---|---|---|
| 5,790,637 A | 8/1998 | Johnson et al. |
| 5,818,447 A | 10/1998 | Wolf et al. |
| 5,889,762 A | 3/1999 | Pajuvirta et al. |
| 6,031,818 A | 2/2000 | Lo et al. |
| 6,128,283 A | 10/2000 | Sabaa et al. |
| 6,141,687 A | 10/2000 | Blair |
| 6,161,082 A | 12/2000 | Goldberg et al. |
| 6,195,694 B1 | 2/2001 | Chen et al. |
| 6,202,084 B1 | 3/2001 | Kumar et al. |
| 6,219,638 B1 | 4/2001 | Padmanabhan et al. |
| 6,298,129 B1 | 10/2001 | Culver et al. |
| 6,311,150 B1 | 10/2001 | Ramaswamy et al. |
| 6,343,067 B1 | 1/2002 | Drottar et al. |
| 6,360,196 B1 | 3/2002 | Poznaski et al. |
| 6,389,016 B1 | 5/2002 | Sabaa et al. |
| 6,438,376 B1 | 8/2002 | Elliott et al. |
| 6,473,425 B1 | 10/2002 | Bellaton et al. |
| 6,574,668 B1 | 6/2003 | Gubbi et al. |
| 6,606,112 B1 | 8/2003 | Falco |
| 6,741,691 B1 | 5/2004 | Ritter et al. |
| 6,754,181 B1 | 6/2004 | Elliott et al. |
| 6,766,373 B1 | 7/2004 | Beadle |
| 6,826,613 B1 | 11/2004 | Wang et al. |
| 6,836,765 B1 | 12/2004 | Sussman |
| 6,842,460 B1 | 1/2005 | Olkkonen et al. |
| 6,850,769 B2 | 2/2005 | Grob et al. |
| 6,898,413 B2 | 5/2005 | Yip et al. |
| 6,912,278 B1 | 6/2005 | Hamilton |
| 6,940,826 B1 | 9/2005 | Simard et al. |
| 6,963,555 B1 | 11/2005 | Brenner et al. |
| 6,975,718 B1 | 12/2005 | Pearce et al. |
| 6,987,756 B1 | 1/2006 | Ravindranath et al. |
| 6,999,575 B1 | 2/2006 | Sheinbein |
| 6,999,932 B1 | 2/2006 | Zhou |
| 7,006,508 B2 | 2/2006 | Bondy et al. |
| 7,010,109 B2 | 3/2006 | Gritzer et al. |
| 7,013,155 B1 | 3/2006 | Ruf et al. |
| 7,079,529 B1 | 7/2006 | Khuc |
| 7,080,158 B1 | 7/2006 | Squire |
| 7,092,385 B2 | 8/2006 | Gallant et al. |
| 7,117,526 B1 | 10/2006 | Short |
| 7,123,710 B2 | 10/2006 | Ravishankar |
| 7,184,415 B2 | 2/2007 | Chaney et al. |
| 7,185,114 B1 | 2/2007 | Hariharasubrahmanian |
| 7,272,377 B2 | 9/2007 | Cox et al. |
| 7,302,496 B1 | 11/2007 | Metzger |
| 7,304,985 B2 | 12/2007 | Sojka et al. |
| 7,345,999 B2 | 3/2008 | Su et al. |
| 7,346,044 B1 | 3/2008 | Chou et al. |
| 7,353,252 B1 | 4/2008 | Yang et al. |
| 7,353,255 B2 | 4/2008 | Acharya et al. |
| 7,412,374 B1 | 8/2008 | Seiler et al. |
| 7,457,279 B1 | 11/2008 | Scott et al. |
| 7,477,282 B2 | 1/2009 | Firestone et al. |
| 7,487,248 B2 | 2/2009 | Moran et al. |
| 7,512,652 B1 | 3/2009 | Appelman et al. |
| 7,542,472 B1 | 6/2009 | Gerendai et al. |
| 7,564,843 B2 | 7/2009 | Manjunatha et al. |
| 7,570,743 B2 | 8/2009 | Barclay et al. |
| 7,574,523 B2 | 8/2009 | Traversat et al. |
| 7,590,758 B2 | 9/2009 | Takeda et al. |
| 7,613,171 B2 | 11/2009 | Zehavi et al. |
| 7,623,476 B2 | 11/2009 | Ravikumar et al. |
| 7,623,516 B2 | 11/2009 | Chaturvedi et al. |
| 7,656,870 B2 | 2/2010 | Ravikumar et al. |
| 7,664,495 B1 | 2/2010 | Bonner et al. |
| 7,769,881 B2 | 8/2010 | Matsubara et al. |
| 7,774,495 B2 | 8/2010 | Pabla et al. |
| 7,778,187 B2 | 8/2010 | Chaturvedi et al. |
| 7,782,866 B1 | 8/2010 | Walsh et al. |
| 7,917,584 B2 | 3/2011 | Arthursson |
| 8,009,586 B2 | 8/2011 | Chaturvedi et al. |
| 8,065,418 B1 | 11/2011 | Abuan et al. |
| 8,200,796 B1 | 6/2012 | Margulis |
| 8,407,576 B1 | 3/2013 | Yin et al. |
| 2001/0050923 A1 | 12/2001 | Park et al. |
| 2002/0031212 A1 | 3/2002 | O'Neil et al. |
| 2002/0037000 A1 | 3/2002 | Park et al. |
| 2002/0038282 A1 | 3/2002 | Montgomery |
| 2002/0042769 A1 | 4/2002 | Gujral et al. |
| 2002/0062285 A1 | 5/2002 | Amann et al. |
| 2002/0064167 A1 | 5/2002 | Khan et al. |
| 2002/0080719 A1 | 6/2002 | Parkvall et al. |
| 2002/0087887 A1 | 7/2002 | Busam et al. |
| 2002/0097150 A1 | 7/2002 | Sandelman et al. |
| 2002/0120757 A1 | 8/2002 | Sutherland et al. |
| 2002/0124096 A1 | 9/2002 | Loguinov et al. |
| 2002/0143548 A1 | 10/2002 | Korall et al. |
| 2002/0150110 A1 | 10/2002 | Inbar et al. |
| 2002/0152325 A1 | 10/2002 | Elgebaly et al. |
| 2002/0156844 A1 | 10/2002 | Maehiro |
| 2002/0166053 A1 | 11/2002 | Wilson |
| 2002/0173303 A1 | 11/2002 | Shibutani |
| 2002/0176404 A1 | 11/2002 | Girard |
| 2002/0178087 A1 | 11/2002 | Henderson et al. |
| 2002/0184310 A1 | 12/2002 | Traversat et al. |
| 2003/0009565 A1 | 1/2003 | Arao |
| 2003/0031210 A1 | 2/2003 | Harris |
| 2003/0035441 A1 | 2/2003 | Cheng et al. |
| 2003/0043764 A1 | 3/2003 | Kim et al. |
| 2003/0044020 A1 | 3/2003 | Aboba et al. |
| 2003/0046056 A1 | 3/2003 | Godoy et al. |
| 2003/0046585 A1 | 3/2003 | Minnick |
| 2003/0061025 A1 | 3/2003 | Abir |
| 2003/0061481 A1 | 3/2003 | Levine et al. |
| 2003/0072485 A1 | 4/2003 | Guerin et al. |
| 2003/0076815 A1 | 4/2003 | Miller et al. |
| 2003/0078858 A1 | 4/2003 | Angelopoulos et al. |
| 2003/0088676 A1 | 5/2003 | Smith et al. |
| 2003/0105812 A1 | 6/2003 | Flowers, Jr. et al. |
| 2003/0110047 A1 | 6/2003 | Santosuosso |
| 2003/0115251 A1 | 6/2003 | Fredrickson et al. |
| 2003/0126213 A1 | 7/2003 | Betzler |
| 2003/0135569 A1 | 7/2003 | Khakoo et al. |
| 2003/0137939 A1 | 7/2003 | Dunning et al. |
| 2003/0158722 A1 | 8/2003 | Lord |
| 2003/0163525 A1 | 8/2003 | Hendriks et al. |
| 2003/0163697 A1 | 8/2003 | Pabla et al. |
| 2003/0172145 A1 | 9/2003 | Nguyen |
| 2003/0174707 A1 | 9/2003 | Grob et al. |
| 2003/0177186 A1 | 9/2003 | Goodman et al. |
| 2003/0177422 A1 | 9/2003 | Tararoukhine et al. |
| 2003/0187650 A1 | 10/2003 | Moore et al. |
| 2003/0202480 A1 | 10/2003 | Swami |
| 2003/0212772 A1 | 11/2003 | Harris |
| 2003/0214955 A1 | 11/2003 | Kim |
| 2003/0217171 A1 | 11/2003 | Von Stuermer et al. |
| 2003/0217318 A1 | 11/2003 | Choi |
| 2003/0220121 A1 | 11/2003 | Konishi et al. |
| 2003/0229715 A1 | 12/2003 | Baratakke et al. |
| 2004/0005877 A1 | 1/2004 | Vaananen |
| 2004/0024879 A1 | 2/2004 | Dingman et al. |
| 2004/0034776 A1 | 2/2004 | Fernando et al. |
| 2004/0034793 A1 | 2/2004 | Yuan |
| 2004/0039781 A1 | 2/2004 | Lavallee et al. |
| 2004/0044517 A1 | 3/2004 | Palmquist |
| 2004/0052234 A1 | 3/2004 | Ameigeiras et al. |
| 2004/0062267 A1 | 4/2004 | Minami et al. |
| 2004/0068567 A1 | 4/2004 | Moran et al. |
| 2004/0100973 A1 | 5/2004 | Prasad |
| 2004/0103212 A1 | 5/2004 | Takeuchi et al. |
| 2004/0128554 A1 | 7/2004 | Maher, III et al. |
| 2004/0133689 A1 | 7/2004 | Vasisht |
| 2004/0139225 A1 | 7/2004 | Takahashi |
| 2004/0139228 A1 | 7/2004 | Takeda et al. |
| 2004/0139230 A1 | 7/2004 | Kim |

(56) References Cited

U.S. PATENT DOCUMENTS

| | | |
|---|---|---|
| 2004/0143678 A1 | 7/2004 | Chari et al. |
| 2004/0148434 A1 | 7/2004 | Matsubara et al. |
| 2004/0153858 A1 | 8/2004 | Hwang |
| 2004/0158471 A1 | 8/2004 | Davis et al. |
| 2004/0162871 A1 | 8/2004 | Pabla et al. |
| 2004/0203834 A1 | 10/2004 | Mahany |
| 2004/0213184 A1 | 10/2004 | Hu et al. |
| 2004/0228279 A1 | 11/2004 | Midtun et al. |
| 2004/0240399 A1 | 12/2004 | Corrao et al. |
| 2004/0249885 A1 | 12/2004 | Petropoulakis et al. |
| 2004/0249953 A1 | 12/2004 | Fernandez et al. |
| 2004/0260952 A1 | 12/2004 | Newman et al. |
| 2004/0267527 A1 | 12/2004 | Creamer et al. |
| 2004/0267938 A1 | 12/2004 | Shoroff et al. |
| 2004/0268257 A1 | 12/2004 | Mudusuru |
| 2005/0004982 A1 | 1/2005 | Vernon et al. |
| 2005/0008024 A1 | 1/2005 | Newpol et al. |
| 2005/0015502 A1 | 1/2005 | Kang et al. |
| 2005/0033843 A1 | 2/2005 | Shahi et al. |
| 2005/0033985 A1 | 2/2005 | Xu et al. |
| 2005/0050227 A1 | 3/2005 | Michelman |
| 2005/0071481 A1 | 3/2005 | Danieli |
| 2005/0086309 A1 | 4/2005 | Galli et al. |
| 2005/0091407 A1 | 4/2005 | Vaziri et al. |
| 2005/0105524 A1 | 5/2005 | Stevens et al. |
| 2005/0119005 A1 | 6/2005 | Segal et al. |
| 2005/0120073 A1 | 6/2005 | Cho |
| 2005/0130650 A1 | 6/2005 | Creamer et al. |
| 2005/0132009 A1 | 6/2005 | Solie |
| 2005/0136911 A1 | 6/2005 | Csapo et al. |
| 2005/0138119 A1 | 6/2005 | Saridakis |
| 2005/0138128 A1 | 6/2005 | Baniel et al. |
| 2005/0143105 A1 | 6/2005 | Okamoto |
| 2005/0144288 A1 | 6/2005 | Liao |
| 2005/0187781 A1 | 8/2005 | Christensen |
| 2005/0187957 A1 | 8/2005 | Kramer et al. |
| 2005/0195802 A1 | 9/2005 | Klein et al. |
| 2005/0198499 A1 | 9/2005 | Salapaka et al. |
| 2005/0201357 A1 | 9/2005 | Poyhonen |
| 2005/0201485 A1 | 9/2005 | Fay |
| 2005/0208947 A1 | 9/2005 | Bahl |
| 2005/0220017 A1 | 10/2005 | Brand et al. |
| 2005/0246193 A1 | 11/2005 | Roever et al. |
| 2005/0249196 A1 | 11/2005 | Ansari et al. |
| 2005/0254440 A1 | 11/2005 | Sorrell |
| 2005/0270992 A1 | 12/2005 | Sanzgiri et al. |
| 2005/0286519 A1 | 12/2005 | Ravikumar et al. |
| 2006/0002355 A1 | 1/2006 | Baek et al. |
| 2006/0062180 A1 | 3/2006 | Sayeedi et al. |
| 2006/0069775 A1 | 3/2006 | Artobello et al. |
| 2006/0072506 A1 | 4/2006 | Sayeedi et al. |
| 2006/0120375 A1 | 6/2006 | Ravikumar et al. |
| 2006/0121902 A1 | 6/2006 | Jagadeesan et al. |
| 2006/0121986 A1 | 6/2006 | Pelkey et al. |
| 2006/0148516 A1 | 7/2006 | Reddy et al. |
| 2006/0165029 A1 | 7/2006 | Melpignano et al. |
| 2006/0168643 A1 | 7/2006 | Howard et al. |
| 2006/0171534 A1 | 8/2006 | Baughman |
| 2006/0182100 A1 | 8/2006 | Li et al. |
| 2006/0183476 A1 | 8/2006 | Morita et al. |
| 2006/0187926 A1 | 8/2006 | Imai |
| 2006/0195402 A1 | 8/2006 | Malina et al. |
| 2006/0203750 A1 | 9/2006 | Ravikumar et al. |
| 2006/0205436 A1 | 9/2006 | Liu et al. |
| 2006/0218624 A1 | 9/2006 | Ravikumar et al. |
| 2006/0230166 A1 | 10/2006 | Philyaw |
| 2006/0233117 A1 | 10/2006 | Tomsu et al. |
| 2006/0246903 A1 | 11/2006 | Kong et al. |
| 2006/0258289 A1 | 11/2006 | Dua |
| 2007/0016921 A1 | 1/2007 | Levi et al. |
| 2007/0019545 A1 | 1/2007 | Alt et al. |
| 2007/0025270 A1 | 2/2007 | Sylvain |
| 2007/0078785 A1 | 4/2007 | Bush et al. |
| 2007/0082671 A1 | 4/2007 | Feng et al. |
| 2007/0110043 A1 | 5/2007 | Girard |
| 2007/0111794 A1 | 5/2007 | Hogan et al. |
| 2007/0116224 A1 | 5/2007 | Burke et al. |
| 2007/0130253 A1 | 6/2007 | Newson et al. |
| 2007/0136459 A1 | 6/2007 | Roche et al. |
| 2007/0165629 A1 | 7/2007 | Chaturvedi et al. |
| 2007/0190987 A1 | 8/2007 | Vaananen |
| 2007/0206563 A1 | 9/2007 | Silver et al. |
| 2007/0239892 A1 | 10/2007 | Ott et al. |
| 2007/0253435 A1 | 11/2007 | Keller et al. |
| 2007/0260359 A1 | 11/2007 | Benson et al. |
| 2007/0274276 A1 | 11/2007 | Laroia et al. |
| 2007/0280253 A1 | 12/2007 | Rooholamini et al. |
| 2007/0294626 A1 | 12/2007 | Fletcher et al. |
| 2007/0297430 A1 | 12/2007 | Nykanen et al. |
| 2008/0005328 A1 | 1/2008 | Shively et al. |
| 2008/0019285 A1 | 1/2008 | John et al. |
| 2008/0032695 A1 | 2/2008 | Zhu et al. |
| 2008/0046984 A1 | 2/2008 | Bohmer et al. |
| 2008/0069105 A1 | 3/2008 | Costa et al. |
| 2008/0080392 A1 | 4/2008 | Walsh et al. |
| 2008/0091813 A1 | 4/2008 | Bodlaender |
| 2008/0123685 A1 | 5/2008 | Varma et al. |
| 2008/0130639 A1 | 6/2008 | Costa-Requena et al. |
| 2008/0168440 A1 | 7/2008 | Regnier et al. |
| 2008/0192756 A1 | 8/2008 | Damola et al. |
| 2008/0235362 A1 | 9/2008 | Kjesbu et al. |
| 2008/0235511 A1 | 9/2008 | O'Brien et al. |
| 2008/0244718 A1 | 10/2008 | Frost et al. |
| 2008/0250408 A1 | 10/2008 | Tsui et al. |
| 2008/0273541 A1 | 11/2008 | Pharn |
| 2008/0320096 A1 | 12/2008 | Szeto |
| 2008/0320565 A1 | 12/2008 | Buch et al. |
| 2009/0003322 A1 | 1/2009 | Isumi |
| 2009/0006076 A1 | 1/2009 | Jindal |
| 2009/0052399 A1 | 2/2009 | Silver et al. |
| 2009/0055473 A1 | 2/2009 | Synnergren |
| 2009/0088150 A1 | 4/2009 | Chaturvedi et al. |
| 2009/0136016 A1 | 5/2009 | Gornoi et al. |
| 2009/0156217 A1 | 6/2009 | Bajpai |
| 2009/0182815 A1 | 7/2009 | Czechowski et al. |
| 2009/0192976 A1 | 7/2009 | Spivack et al. |
| 2009/0234967 A1 | 9/2009 | Yu et al. |
| 2009/0240821 A1 | 9/2009 | Juncker et al. |
| 2009/0257433 A1 | 10/2009 | Mutikainen et al. |
| 2009/0300673 A1 | 12/2009 | Bachet et al. |
| 2009/0327516 A1 | 12/2009 | Amishima et al. |
| 2010/0011108 A1 | 1/2010 | Clark et al. |
| 2010/0011111 A1 | 1/2010 | Vizaei |
| 2010/0049980 A1 | 2/2010 | Barriga et al. |
| 2010/0058353 A1* | 3/2010 | Turski .................. G06F 9/54 719/311 |
| 2010/0077023 A1 | 3/2010 | Eriksson |
| 2010/0107205 A1 | 4/2010 | Foti |
| 2010/0174783 A1 | 7/2010 | Zarom |
| 2010/0191954 A1 | 7/2010 | Kim et al. |
| 2010/0223047 A1 | 9/2010 | Christ |
| 2010/0279670 A1 | 11/2010 | Ghai et al. |
| 2010/0299150 A1 | 11/2010 | Fein et al. |
| 2010/0299313 A1 | 11/2010 | Orsini et al. |
| 2010/0312832 A1 | 12/2010 | Allen et al. |
| 2010/0312897 A1 | 12/2010 | Allen et al. |
| 2011/0040836 A1 | 2/2011 | Allen et al. |
| 2011/0099612 A1 | 4/2011 | Lee et al. |
| 2011/0122864 A1 | 5/2011 | Cherifi et al. |
| 2011/0141220 A1 | 6/2011 | Miura |
| 2011/0145687 A1 | 6/2011 | Grigsby et al. |
| 2011/0307556 A1 | 12/2011 | Chaturvedi et al. |
| 2011/0314134 A1 | 12/2011 | Foti |
| 2011/0320821 A1 | 12/2011 | Alkhatib et al. |
| 2012/0078609 A1 | 3/2012 | Chaturvedi et al. |
| 2012/0124191 A1 | 5/2012 | Lyon |
| 2012/0263144 A1 | 10/2012 | Nix |
| 2013/0067004 A1 | 3/2013 | Logue et al. |
| 2013/0106989 A1 | 5/2013 | Gage et al. |

(56) References Cited

U.S. PATENT DOCUMENTS

| | | | |
|---|---|---|---|
| 2013/0111064 A1 | 5/2013 | Mani et al. | |
| 2015/0026700 A1* | 1/2015 | Chaturvedi | H04W 12/08 |
| | | | 719/313 |

FOREIGN PATENT DOCUMENTS

| | | |
|---|---|---|
| EP | 1638275 A2 | 3/2006 |
| EP | 1848163 A1 | 10/2007 |
| EP | 1988697 A1 | 11/2008 |
| EP | 1988698 A1 | 11/2008 |
| JP | 2005-94600 | 4/2005 |
| JP | 2007-043598 | 2/2007 |
| KR | 10-2005-0030548 | 3/2005 |
| WO | WO 03/079635 | 9/2003 |
| WO | WO 2004/063843 | 7/2004 |
| WO | WO 2005/009019 | 1/2005 |
| WO | 2006064047 A1 | 6/2006 |
| WO | WO 2006/075677 | 7/2006 |
| WO | WO 2008099420 A2 | 8/2008 |

OTHER PUBLICATIONS

International Search Report and Written Opinion of the International Searching Authority from PCT/US2006/047841, dated Sep. 12, 2008.

International Search Report and Written Opinion of the International Searching Authority from PCT/US2007/002424, dated Aug. 14, 2007.

International Search Report and Written Opinion of the International Searching Authority from PCT/US2007/068820, dated Jun. 11, 2008.

International Search Report and Written Opinion of the International Searching Authority from PCT/US2007/068821, dated Jun. 14, 2008.

International Search Report and Written Opinion of the International Searching Authority from PCT/US2007068823, dated Jun. 1, 2008.

Jeff Tyson, "How Instant Messaging Works", www.verizon.com/learningcenter, Mar. 9, 2005.

Rory Bland, et al,"P2P Routing" Mar. 2002.

Rosenberg, "STUN—Simple Traversal of UDP Through NAT", Sep. 2002, XP015005058.

Salman A. Baset, et al, "An Analysis of the Skype Peer-To-Peer Internet Telephony Protocol", Department of computer Science, Columbia University, New York, NY, USA, Sep. 15, 2004.

Singh et al., "Peer-to Peer Internet Telephony Using SIP", Department of Computer Science, Columbia University, Oct. 31, 2004, XP-002336408.

Sinha, S. and Oglieski, A., A TCP Tutorial, Nov. 1998 (Date posted on Internet: Apr. 19, 2001) [Retrieved from the Internet <URL:http://www.ssfnet.org/Exchange/tcp/tcpTutorialNotes.html>].

Pejman Khadivi, Terence D. Todd and Dongmei Zhao, "Handoff trigger nodes for hybrid IEEE 802.11 WLAN/cellular networks," Proc. of IEEE International Conference on Quality of Service in Heterogeneous Wired/Wireless Networks, pp. 164-170, Oct. 18, 2004.

International Search Report and Written Opinion of the International Searching Authority from PCT/US2008/078142, dated Mar. 27, 2009.

International Search Report and Written Opinion of the International Searching Authority from PCT/US2008/084950, dated Apr. 27, 2009.

Hao Wang, Skype VoIP service-architecture and comparison, In: INFOTECH Seminar Advanced Communication Services (ASC), 2005, pp. 4, 7, 8.

Seta, N.; Miyajima, H.; Zhang, L;; Fujii, T., "AII-SIP Mobility: Session Continuity on Handover in Heterogeneous Access Environment," Vehicular Technology Conference, 2007. VTC 2007-Spring. IEEE 65th, Apr. 22-25, 2007, pp. 1121-1126.

International Search Report and Written Opinion of the International Searching Authority from PCT/US2008/075141, dated Mar. 5, 2009.

Qian Zhang; Chuanxiong Guo; Zihua Guo; Wenwu Zhu, "Efficient mobility management for vertical handoff between WWAN and WLAN," Communications Magazine, IEEE, vol. 41. issue 11, Nov. 2003, pp. 102-108.

Isaacs, Ellen et al., "Hubbub: A sound-enhanced mobile instant messenger that supports awareness and opportunistic interactions," Proceedings of the SIGCHI Conference on Human Factors in Computing Systems; vol. 4, Isue No. 1; Minneapolis, Minnesota; Apr. 20-25, 2002; pp. 179-186.

PCT: International Preliminary Report on Patentability of PCT/US2008/084950; Jun. 1, 2010; 5 pgs.

International Search Report and Written Opinion of the International Searching Authority from PCT/US2014/039777, dated Sep. 30, 2014.

International Search Report and Written Opinion of the International Searching Authority from PCT/US2014/39782, dated Oct. 17, 2014.

International Search Report and Written Opinion of PCT/US2015/43633, Oct. 26, 2015, 21 pgs.

PCT: International Search Report and Written Opinion of PCT/US2015/43630 (related application), Oct. 30, 2015, 20 pgs.

PCT: International Preliminary Report on Patentability of PCT/US2014/039777; Jan. 28, 2016; 8 pgs.

PCT: International Search Report and Written Opinion for PCT/US2011/024870; Oct. 26, 2011; 12 pages.

J. Rosenberg et al. "Session Traversal Utilities for NAT (STUN)", draft-ietf-behave-rfc3489bis-06, Mar. 5, 2007.

PCT: International Search Report and Written Opinion for PCT/US2011/028685; Nov. 9, 2011; 10 pages.

PCT: International Search Report and Written Opinion for PCT/US2011/029954; Nov. 24, 2011; 8 pages.

PCT: International Search Report and Written Opinion for PCT/US2011/024891; Nov. 25, 2011; 9 pages.

PCT: International Search Report and Written Opinion for PCT/US2011/031245; Dec. 26, 2011; 13 pages.

Wireless Application Protocol—Wireless Transport Layer Security Specification, Version Feb. 18, 2000, Wireless Application Forum, Ltd. 2000; 99 pages.

PCT: International Search Report and Written Opinion for PCT/US2011/040864; Feb. 17, 2012; 8 pages.

PCT: International Search Report and Written Opinion for PCT/US2011/041565; Jan. 5, 2012; 7 pages.

PCT: International Search Report and Written Opinion for PCT/US2011/031246; Dec. 27, 2011; 8 pages.

PCT: International Search Report and Written Opinion for PCT/US2011/049000; Mar. 27, 2012; 10 pages.

PCT: International Search Report and Written Opinion for PCT/US2011/051877; Apr. 13, 2012; 7 pages.

PCT: International Search Report and Written Opinion for PCT/US2011/055101; May 22, 2012; 9 pages.

Balamurugan Karpagavinayagam et al. (Monitoring Architecture for Lawful Interception in VoIP Networks, ICIMP 2007, Aug. 24, 2008).

NiceLog User's Manual 385A0114-08 Rev. A2, Mar. 2004.

WISPA: Wireless Internet Service Providers Association; WISPA-CS-IPNA-2.0; May 1, 2009.

PCT: International Preliminary Report on Patentability of PCT/US2011/024870; Aug. 30, 2012; 7 pgs.

RFC 5694 ("Peer-to-Peer (P2P) Architecture: Definition, Taxonomies, Examples, and Applicability", Nov. 2009).

Mahy et al., The Session Initiation Protocol (SIP) "Replaces" Header, Sep. 2004, RFC 3891, pp. 1-16.

PCT: International Preliminary Report on Patentability of PCT/US2011/024891; Aug. 30, 2012; 6 pgs.

T. Dierks & E. Rescorla, The Transport Layer Security (TLS) Protocol (Ver. 1.2, Aug. 2008) retrieved at http://tools.ietf.org/htmllrfc5246. Relevant pages provided.

J. Rosenberg et al., SIP: Session Initiation Protocol (Jun. 2008) retrieved at http://tools.ietf.org/html/rfc3261. Relevant pages provided.

(56) References Cited

OTHER PUBLICATIONS

Philippe Bazot et al., Developing SIP and IP Multimedia Subsystem (IMS) Applications (Feb. 5, 2007) retrieved at redbooks IBM form No. SG24-7255-00. Relevant pages provided.
PCT: International Preliminary Report on Patentability of PCT/US2011/028685; Oct. 4, 2012; 6 pgs.
PCT: International Preliminary Report on Patentability of PCT/US2011/031245; Oct. 26, 2012; 9 pgs.
PCT: International Preliminary Report on Patentability of PCT/US2011/029954; Oct. 11, 2012; 5 pgs.
PCT: International Preliminary Report on Patentability of PCT/US2011/031246; Nov. 8, 2012; 5 pgs.
Rosenberg, J; "Interactive Connectivity Establishment (ICE): A Protocol for Network Address Translator (NAT) Traversal for Offer/Answer Protocols"; Oct. 29, 2007; I ETF; I ETF draft of RFC 5245, draft-ietf-mmusic-ice-19; pp. 1-120.
Blanchet et al; "IPv6 Tunnel Broker with the Tunnel Setup Protocol (TSP)"; May 6, 2008; IETF; IETF draft of RFC 5572, draftblanchet-v6ops-tunnelbroker-tsp-04; pp. 1-33.
Cooper et al; "NAT Traversal for dSIP"; Feb. 25, 2007; IETF; IETF draft draft-matthews-p2psip-dsip-nat-traversal-00; pp. 1-23.
Cooper et al; "The Effect of NATs on P2PSIP Overlay Architecture"; IETF; IETF draft draft-matthews-p2psip-nats-and-Overlays-01.txt; pp. 1-20.
Srisuresh et al; "State of Peer-to-Peer(P2P) Communication Across Network Address Translators(NATs)"; Nov. 19, 2007; I ETF; I ETF draft for RFC 5128, draft-ietf-behave-p2p-state-06.txt; pp. 1-33.
PCT: International Search Report and Written Opinion for PCT/US2012/046026; Oct. 18, 2012; 6 pages.
Dunigan, Tom, "Almost TCP over UDP (atou)," last modified Jan. 12, 2004; retrieved on Jan. 18, 2011 from <http://www.csm.oml.gov/~dunigan/net100/atou.html> 18 pgs.
PCT: International Preliminary Report on Patentability of PCT/US2011/040864; Jan. 3, 2013; 6 pgs.
PCT: International Preliminary Report on Patentability of PCT/US2011/041565; Jan. 10, 2013; 6 pgs.
PCT: International Preliminary Report on Patentability of PCT/US2011/049000; Feb. 26, 2013; 6 pgs.
PCT: International Preliminary Report on Patentability of PCT/US2011/051877; Mar. 26, 2013; 5 pgs.
PCT: International Preliminary Report on Patentability of PCT/US2011/055101; Apr. 16, 2013; 7 pgs.
PCT: International Preliminary Report on Patentability of PCT/US2012/046026; Jan. 30, 2014; 5 pgs.
PCT: International Preliminary Report on Patentability of PCT/US2008/075141; Mar. 9, 2010; 5 pgs.
PCT: International Preliminary Report on Patentability of PCT/US2007/068820; Dec. 31, 2008; 8 pgs.
PCT: International Preliminary Report on Patentability of PCT/US2007/068823; Nov. 27, 2008; 8 pgs.
PCT: International Preliminary Report on Patentability of PCT/US2006/047841; Nov. 6, 2008; 7 pgs.
PCT: International Preliminary Report on Patentability of PCT/US2007/002424; Aug. 7, 2008; 6 pgs.
PCT: International Preliminary Report on Patentability of PCT/US2006/040312; May 2, 2008; 5 pgs.
PCT: International Preliminary Report on Patentability of PCT/IB2005/000821; Oct. 19, 2006; 10 pgs.
Chathapuram, "Security in Peer-To-Peer Networks", Aug. 8. 2001, XP002251813.
International Search Report and Written Opinion of the International Searching Authority from PCT/IB2005/000821, dated Aug. 5, 2005.
International Search Report and Written Opinion of the International Searching Authority from PCT/US2006/032791, dated Dec. 18, 2006.

* cited by examiner

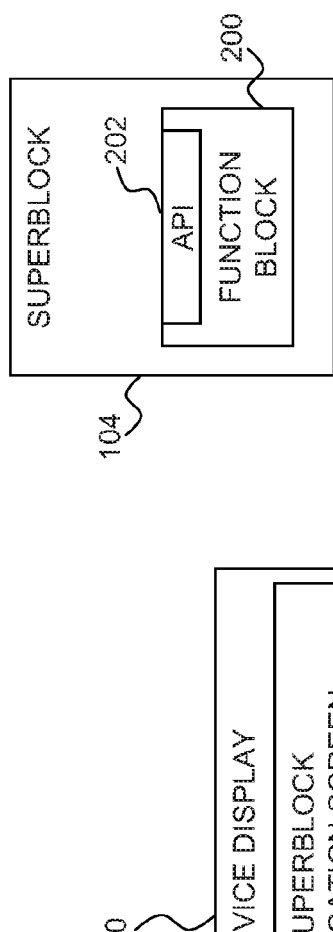
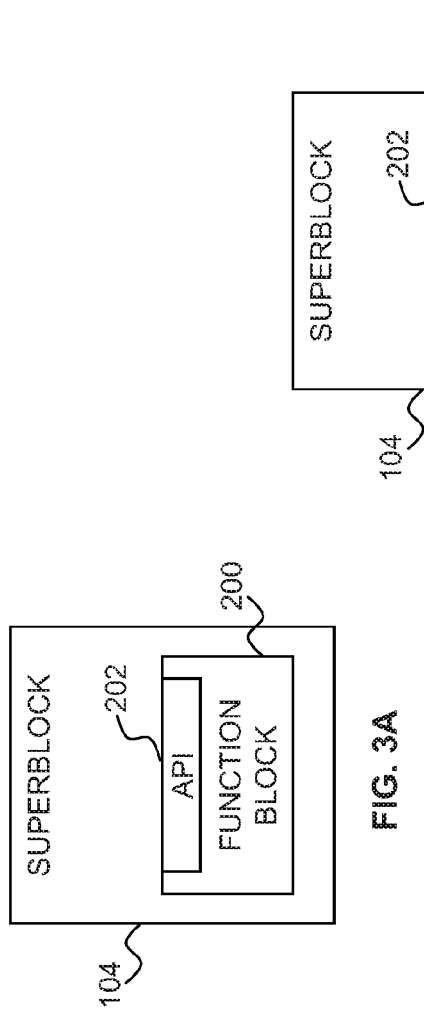
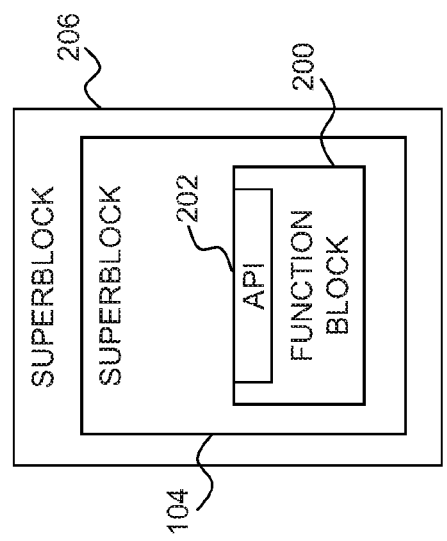
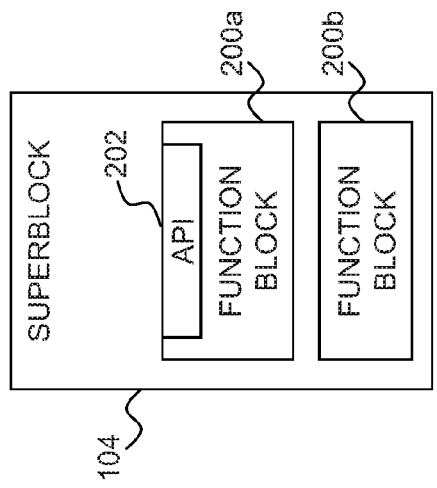

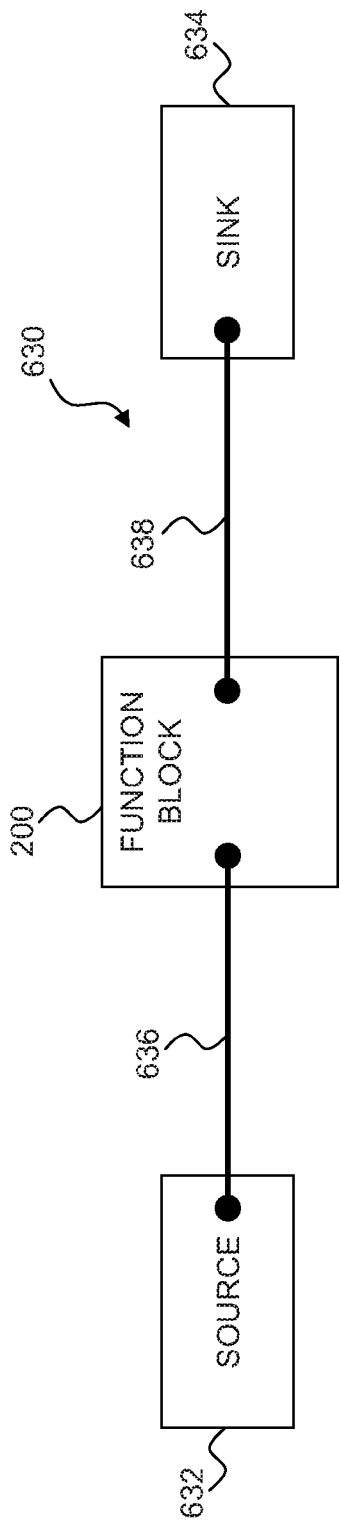
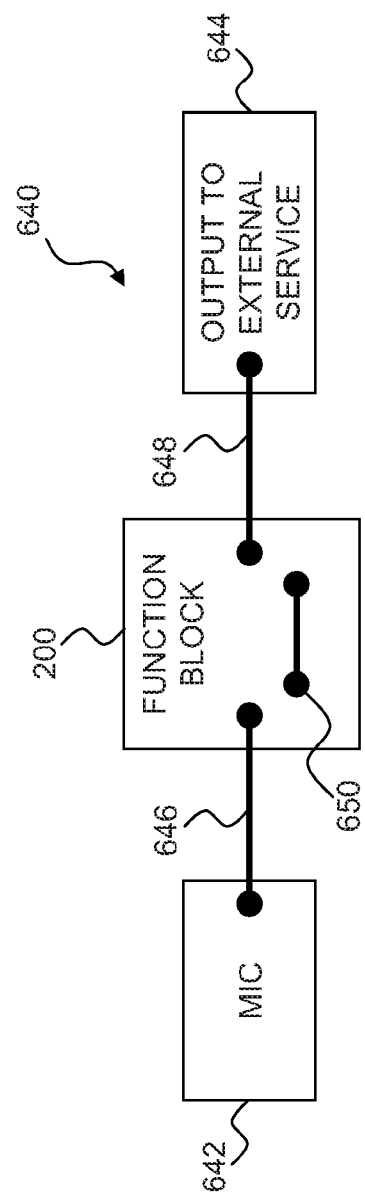

SYSTEM AND METHOD FOR PROVIDING ADDITIONAL FUNCTIONALITY TO EXISTING SOFTWARE IN AN INTEGRATED MANNER

CROSS-REFERENCE TO RELATED APPLICATIONS

This application is a continuation of U.S. application Ser. No. 14/690,619, filed Apr. 20, 2015, entitled SYSTEM AND METHOD FOR PROVIDING ADDITIONAL FUNCTIONALITY TO EXISTING SOFTWARE IN AN INTEGRATED MANNER which published as U.S. Patent Application Publication No. 2015-0229706 on Aug. 13, 2015, now U.S. Pat. No. 9,270,744, issued on Feb. 23, 2016. U.S. application Ser. No. 14/690,619 is a continuation of U.S. application Ser. No. 14/024,027, filed on Sep. 11, 2013, entitled SYSTEM AND METHOD FOR PROVIDING ADDITIONAL FUNCTIONALITY TO EXISTING SOFTWARE IN AN INTEGRATED MANNER published as U.S. Application Publication No. 2015-0026700 on Jan. 22, 2015, now U.S. Pat. No. 9,027,032, issued on May 5, 2015. U.S. application Ser. No. 14/024,027 claims the benefit of U.S. Provisional Application No. 61/846,958, filed on Jul. 16, 2013, entitled SYSTEM AND METHOD FOR PROVIDING ADDITIONAL FUNCTIONALITY TO EXISTING SOFTWARE IN AN INTEGRATED MANNER U.S. application Ser. Nos. 14/690,619, 14/024,027 and 61/846,958, U.S. Application Publication Nos. 2015-0229706 and 2015-0026700, and U.S. Pat. Nos. 9,270,744 and 9,027,032 are incorporated by reference herein in their entirety.

BACKGROUND

The manner in which functionality is accessed in certain environments, such as mobile device environments, may impact performance and/or battery life. Accordingly, what is needed are a system and method that addresses these issues.

BRIEF DESCRIPTION OF THE DRAWINGS

For a more complete understanding, reference is now made to the following description taken in conjunction with the accompanying Drawings in which:

FIG. 2B illustrates one embodiment of the device of FIG. 2A with a superblock application displayed simultaneously with the additional functionality provided by a function block;

FIG. 3A illustrates one embodiment of the function block of FIG. 2 incorporated into the superblock;

FIG. 3B illustrates one embodiment of the superblock of FIG. 3A nested within another superblock;

FIG. 3C illustrates one embodiment of the function block of FIG. 2 incorporated into the superblock in multiple parts;

FIG. 6B illustrates one embodiment of a diagram showing a source and a sink coupled by the function block of FIG. 2;

FIG. 6C illustrates a more detailed embodiment of the diagram of FIG. 6B;

DETAILED DESCRIPTION

Figure 2A:
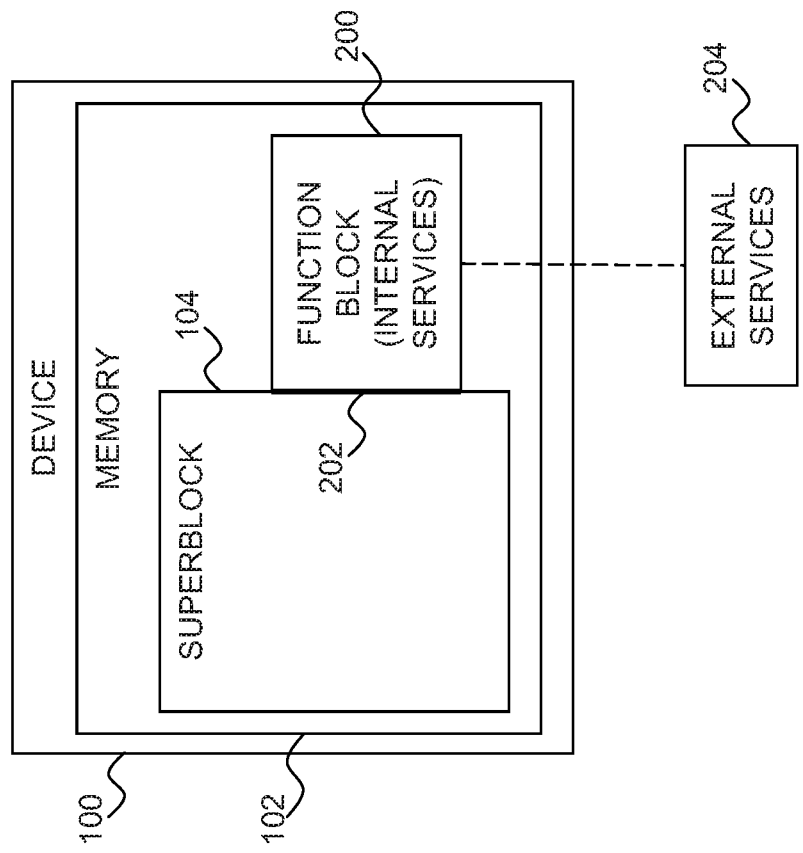
FIG. 2A illustrates one embodiment of the device of FIG. 1 with the addition of a function block.

It is understood that the following disclosure provides many different embodiments or examples. Specific examples of components and arrangements are described below to simplify the present disclosure. These are, of course, merely examples and are not intended to be limiting. In addition, the present disclosure may repeat reference numerals and/or letters in the various examples. This repetition is for the purpose of simplicity and clarity and does not in itself dictate a relationship between the various embodiments and/or configurations discussed.

Figure 1:
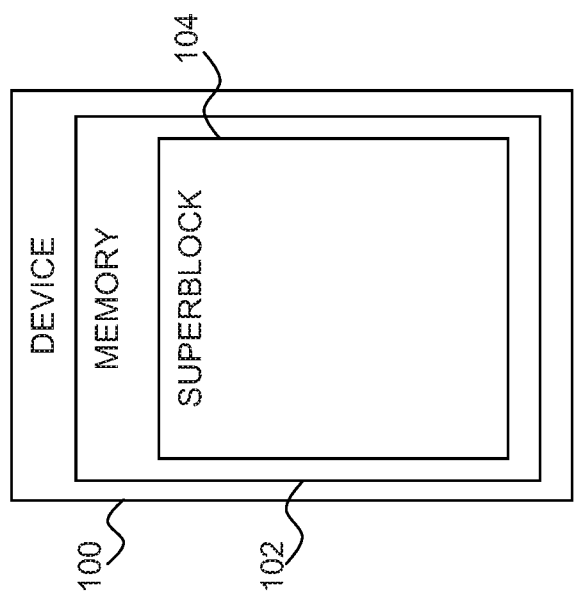
FIG. 1 illustrates one embodiment of a device having a memory and a superblock stored within the memory.

Referring to FIG. 1, in one embodiment, a device 100 includes a memory 102. The memory 102 stores a superblock 104, which may be a set of executable instructions used to perform one or more functions via the device 100. For example, the device 100 may be a mobile device and the superblock 104 may be an application (the "superblock application") on the mobile device. The instructions of the superblock 104 enable a user of the mobile device to perform one or more actions, such as communications, data manipulation, and/or data management. However, the functionality of the superblock application is constrained to some degree by the device 100 and by the instructions of the superblock itself.

With respect to the device 100, the amount of available memory, how the memory 102 is structured (e.g., segment sizes), and how the memory is managed (e.g., how much memory is allocated to the superblock 104, how swapping occurs when another application needs physical memory, and how multiple applications are handled) are generally outside of the control of the superblock 104. However, mobile devices frequently provide a separate memory space for each application that is being run and so must keep track of the memory boundaries for each application. This tracking requires resources, such as processing time and power.

Furthermore, as a user switches between applications (e.g., switches contexts), the device 100 may have to swap instructions into and out of physical memory, which impacts performance and battery life. While context switching occurs in other devices, such as desktop and laptop computers, the resource impact used for those context switches is generally lower due to the greater amount of resources available for such devices compared to mobile devices. For example, as mobile devices generally have a smaller memory footprint compared to larger devices such as desktop and laptop computers, not only will a mobile device likely need to swap files in and out of memory when a context switch occurs, but the processor load and battery life will likely be negatively impacted on the mobile device more than would occur on larger devices having more resources. In addition, while a single application may use multi-threading and therefore require the allocation of processor time for different threads, swapping between applications is generally a more resource intensive task for a mobile device.

With respect to the instructions of the superblock 104, additional functionality may be desired for the superblock application that is not provided by the instructions. For example, the superblock application may not currently support a particular type of data and/or operation (e.g., audio, video, email, and/or file transfer) and it may be desirable for the superblock application to do so. To provide such additional functionality, instructions would have to be added to the superblock 102 to give the superblock application the ability to support the data type and/or operation. This process typically entails reworking the superblock application to include the desired functionality and then releasing the updated version of the superblock application for use. Depending on the complexity and nature of the superblock application and the desired functionality, this process may take a substantial amount of time, effort, and/or expense.

One alternative is to use another application to provide the desired functionality, but this may not be a satisfactory solution. For example, assume the superblock 102 provides a superblock application that needs email functionality. On current mobile devices, a user would typically select a link in the superblock application, such as an email address. Selection of the link would launch an email application (or switch context to an email application if one is already running), which removes the user from the superblock application and places the user in the email application. The user would then compose and send the email before switching back to the superblock application. This process of leaving the superblock application, performing some other function, and then returning to the superblock application is currently a common occurrence for mobile device users.

However, this process is disruptive, difficult to manage, and pulls the user away from the superblock application while the provider of the superblock application may want the user to continue to stay in their application. Furthermore, the functions of the superblock application are not available while in the other application, and so the user may have to switch back and forth between the superblock application and the other application in order to interact with both applications. This is inefficient and frustrating for the user, and may also increase the number of errors in the text of the email since both applications are not simultaneously available for reference.

Another example is a video window for a phone call. Assume a user is in the superblock application and has a question about data that the superblock application is displaying. In order to call and visually interact with someone about the question and still have access to the data, the user has to conduct the call while switching back and forth between the video window of the call and the superblock application. This is extremely disruptive to the user and limits the benefits of the video call, which include the ability to interact with someone on a visual basis rather than just an audio basis.

Yet another example is a user walking around a shop floor, engaged in his or her duties. In order to join a virtual meeting, the user will have to exit the superblock application, find and/or enter the meeting information using another application, and join the meeting using the other application. As with the preceding example, this is extremely disruptive to the user, wastes time, and lowers productivity.

Referring to FIGS. 2A and 2B, in another embodiment, the superblock 104 of FIG. 1 is illustrated with a function block 200 attached via a glue point 202 (FIG. 2A). It is understood that FIG. 2A is for purposes of illustration and may not represent an actual arrangement of the superblock 104 and function block 200 in the memory 102.

The function block 200 includes instructions for providing the superblock 104 with one or more functions (e.g., capabilities) that are not otherwise possessed by the superblock 104. Such functions are illustrated in part with respect to FIG. 12, and may include instant messaging, presence (e.g., online, offline, and away), audio, video, collaboration (e.g., sharing of applications, documents, and/or files), whiteboard, file transfer, email, backgrounding, push notifications, conferencing, meetings, and/or other functions. Continuing the previous examples, the function block 200 may provide email or video capabilities for the superblock 104 and does so by providing those capabilities within the superblock application. Although the functions need not be provided visually as shown in FIG. 2B (e.g., in the case of playing an audio file), visual functions may also be presented without leaving the superblock application display. In other words, there is no need to switch context to an email application or to any other application in order to access the additional functionality provided by the function block 200.

To accomplish this, the function block 200 may be provided as a set of instructions that are included in the superblock 104. For example, the function block 200 may be provided as a software developer's kit (SDK) or as an otherwise independent module by a developer unrelated to the superblock 104. The developer of the superblock 104 may then compile or otherwise include the function block instructions in the superblock 104. This ensures that the function block 200 will occupy the same memory space as the superblock 104 unless otherwise placed elsewhere by the mobile device 100. For example, as the superblock 104 likely has little or no control over how the mobile device 100 handles memory management, the mobile device may actually separate some or all of the instructions making up the superblock 104 and the function block 200. However, by including the instructions for the function block 200 within the instructions for the superblock 104, the likelihood that the instructions will be separated may be minimized. The independent nature of the function block 200 means that the developer of the superblock 104 needs little information about the operation of the function block 100 other than how to access the services.

Furthermore, the function block 200 may be handled by developers as a single block of instructions or as multiple blocks depending on the operating system environment. For example, the function block 200 may be handled as a single block in an environment such as iOS (a mobile operating system developed and distributed by Apple Inc. of Cupertino, Calif.), while the function block 200 may be handled as multiple blocks in an environment such as Android (a mobile operating system released as open source by Google Inc. of Mountain View, Calif.).

The function block 200 may be configurable after being distributed as part of the superblock application. For example, the function block 200 may provide access to certain parameters, such as network address information of a server for the external services 204. Other parameters, such as call parameters (e.g., payload size) may also be configurable.

The function block 200 may provide services in a self-contained manner (e.g., internal services that may be provided without needing support outside of the device 100) or may use one or more external services 204. The external services 204 may be provided via a server, a peer-to-peer endpoint, and/or by any other source with which the function block 200 is able to communicate. For example, the function block 200 may be able to provide audio/video playback services for a file stored in the memory 102 without needing anything outside of the device 100, assuming the device 100 includes a screen for displaying the video and speakers and/or a headset for sound output.

However, for an audio/video call session, the function block 200 needs to connect to another device in order to establish the session, even though it can play audio/video locally. In order to connect to the other device, the function block 200 may use the services 204. Accordingly, how the function block 200 handles a particular service request from the superblock 104 may depend on the specific service and the resource needs of that service. From the point of view of the superblock 104, whether the function block 200 uses local and/or external services does not matter as the superblock 104 is simply requesting the service from the function block 200. In embodiments that use an external service 204, the function block 200 is the entity between the superblock 104 and the external service 204, but does not control either the superblock 104 or the external service 204.

In the case of a request from the external services 204 (e.g., an incoming file transfer or phone call), the handling performed by the function block 200 may also depend on the specific service and the resource needs of that service. For example, the function block 200 may send a notification to the superblock 104 and wait for a response, or may handle the externally initiated request according to defined parameters.

Returning to the previous examples, the function block 200 may provide the superblock application with email functionality that enables a user to receive notifications, check email, and compose/edit/send/manage email without leaving the superblock application. For the audio/video phone call, the function block 200 may provide a video window for the phone call within the display of the superblock application, enabling a user to simultaneously see the video window and the superblock application. The video window may be resizable and/or movable. For the user walking around on the shop floor, the function block 200 may enable the user to receive a meeting notification, accept the meeting, and enter the meeting, all within the superblock application. To accomplish this, the function block 200 may hook into the meeting information (e.g., on a server) and render this in the superblock application.

Referring to FIG. 3A, one embodiment of the superblock 104 illustrates the role of the glue point 202 in enabling the superblock 104 to interact with the function block 200. For example, the glue point 202 may be an application programming interface (API) and the superblock 104 may make API calls to the function block 200 to access the function block's capabilities. The function block 200 then provides services to the superblock 104 in response to the API calls. In some embodiments, the function block 200 may also provide notifications to the superblock 104 in response to events triggered by the external services 204.

In the present example, the set of instructions that make up the function block 200 may be used with many different applications and on many different platforms and accessed via the API 202, although some customization may be performed if needed or desired. The function block 200 may be viewed as a set of instructions providing intelligence needed to perform the tasks described herein, and that set of instructions may be compiled or otherwise incorporated into the instructions of the superblock 104. As the instructions can be incorporated into many different applications to satisfy many different needs, some of the capabilities provided by the function block 200 may not be used by a particular application, but may still be present. In other embodiments, functionality that is not desired may be removed to minimize the footprint of the function block 200.

One embodiment of a header for the function block 200 (referred to in the header text as the Amadeo block) may be as follows:

```
#ifndef AMADEOBLOCK_H
#define AMADEOBLOCK_H
#include <string>
#include <list>
    #include "AmadeoBlockConfig.h"
    #include "AmadeoBlockCB.h"
    class AmadeoBlock
    {
    public:
        static AmadeoBlock& instance( );
        static bool UnlockSDK( const std::string& key );
        virtual bool Initialize( const AmadeoBlockConfig& config, AmadeoBlockCB* callback ) = 0;
        virtual bool Finalize( ) = 0;
        virtual bool Activate( ) = 0;
        virtual bool Deactivate( ) = 0;
        virtual bool SetPresence( const std::string& presence, const std::string& text ) = 0;
        virtual bool AddContact( const std::string& contact, const std::string& displayname, const std::string& group ) = 0;
        virtual bool DeleteContact( const std::string& contact, const std::string& group ) = 0;
        virtual bool MoveContact( const std::string& contact, const std::string& fromgroup, const std::string& togroup, const std::string& nickname ) = 0;
        virtual bool CopyContact( const std::string& contact, const std::string&
```

-continued

```
newgroup, const std::string& nickname ) = 0;
        virtual bool AuthorizeContact( const std::string& contact, const
std::sring& group ) = 0;
        virtual bool RejectContact( const std::string& contact ) = 0;
        virtual bool BlockContact( const std::string& contact ) = 0;
        virtual bool UnblockContact( const std::string& contact ) = 0;
        virtual bool AddGroup( const std::string &group ) = 0;
        virtual bool DeleteGroup( const std::string& group ) = 0;
        virtual bool RenameGroup( const std::string& oldgroup, const std::string&
newgroup ) = 0;
        virtual bool Search( const std::string& searchstring ) = 0;
        virtual bool SendIM( const std::string& who, const std::string& msg ) = 0;
        virtual bool StartIMConf( std::string& roomid, const
std::list<std::string>& contacts, const std::string& subject ) = 0;
        virtual bool EndIMConf( const std::string& roomid ) = 0;
        virtual bool AcceptIMConf( const std::string& roomid ) = 0;
        virtual bool SendConfIM( const std::string& roomid, const std::string&
msg ) = 0;
        virtual bool AddPartyIMConf( const std::string& roomid, const
std::string& invitee ) = 0;
        virtual bool StartFT( std::string& sessionid, const std::string& to, const
std::string& filename ) = 0;
        virtual bool AcceptFT( const std::string& sessionid, const std::string&
pathtosave ) = 0;
        virtual bool CancelFT( const std::string& sessionid ) = 0;
        virtual bool DeclineFT( const std::string& sessionid ) = 0;
        virtual bool Call Start( const std::string& calledparty, std::string& callid,
bool startvideo ) = 0;
        virtual bool CallAccept( const std::string& callid, bool startvideo ) = 0;
        virtual bool CallEnd( const std::string& callid ) = 0;
        virtual bool CallHold( const std::string& callid ) = 0;
        virtual bool CallUnhold( const std::string& callid ) = 0;
        virtual bool CallMute( const std::string& callid ) = 0;
        virtual bool CallUnmute( const std::string& callid ) = 0;
        virtual bool AddVideo( const std::string& callid ) = 0;
        virtual bool RemoveVideo( const std::string& callid ) = 0;
        virtual bool CallTransfer( const std::string& callid, const std::string&
transferparty ) = 0;
        virtual bool CallForward( const std::string& callid, const std::string&
forwardparty ) = 0;
        virtual bool CallPark( const std::string& callid ) = 0;
        virtual bool CallPickup( const std::string& slotid ) = 0;
        virtual bool CallVoicemail( const std::string& callid ) = 0;
        virtual bool CallMerge( const std::string& callid, const std::string&
othercallid ) = 0;
        virtual bool CallUnmerge( const std::string& callid ) = 0;
        virtual bool SendDTMF( const std::string& callid, char digit ) = 0;
        virtual bool Escalate( const std::string& callid, const
std::list<std::string>& targets ) = 0;
        virtual bool Deescalate( const std::string& callid, const
std::list<std::string>& targets ) = 0;
        virtual bool VMRefresh( ) = 0;
        virtual bool VMFetch( const std::string& itemid ) = 0;
        virtual bool VMDelete( const std::string& itemid ) = 0;
        virtual bool VMPlay( const std::string& itemid ) = 0;
        virtual bool SharingStart( const std::string& callid ) = 0;
        virtual bool SharingStop( const std::string& callid ) = 0;
        virtual bool WBStart( const std::string& target, const std::string& wbid ) = 0;
        virtual bool WBEnd( const std::string& wbid ) = 0;
        virtual bool WB Send( const std::string& wbid, const std::string& wbdata ) = 0;
        virtual bool Logging(bool enable) = 0;
        virtual bool GoToBackground( ) = 0;
        virtual bool MonitorNetwork( bool checknetwork ) = 0;
    protected:
        AmadeoBlock( );
    private:
        AmadeoBlock(const AmadeoBlock&);
        const AmadeoBlock& operator=(const AmadeoBlock&);
};
#endif // AMADEOBLOCK_H
```

Referring to FIG. 3B, another embodiment illustrates the superblock 104 as being part of another superblock 206. It is understood that any number of nested superblocks may be present. The function block 200 may be accessible to only the superblock 104, or may be accessible to one or more of the other superblocks (e.g., the superblock 206), either directly or via the superblock 104. For example, the superblock 206 may be able to make an API call directly to the function block 200 in some embodiments, or may only be able to make a call through the superblock 104 in other embodiments (e.g., the superblock 206 may call the superblock 104 for a service, and the superblock 104 may in turn make an API call to the function block 200 for that service).

Referring to FIG. 3C, as previously stated, it is understood that the function block 200 need not be a single block in memory. As illustrated by blocks 200a and 200b, the function block 200 may be separated into different parts automatically (e.g., due to the operation of the operating system and how it handles memory allocation) or may be handled as separate parts during integration into the superblock application (e.g., by the developer of the superblock application).

Figure 4:
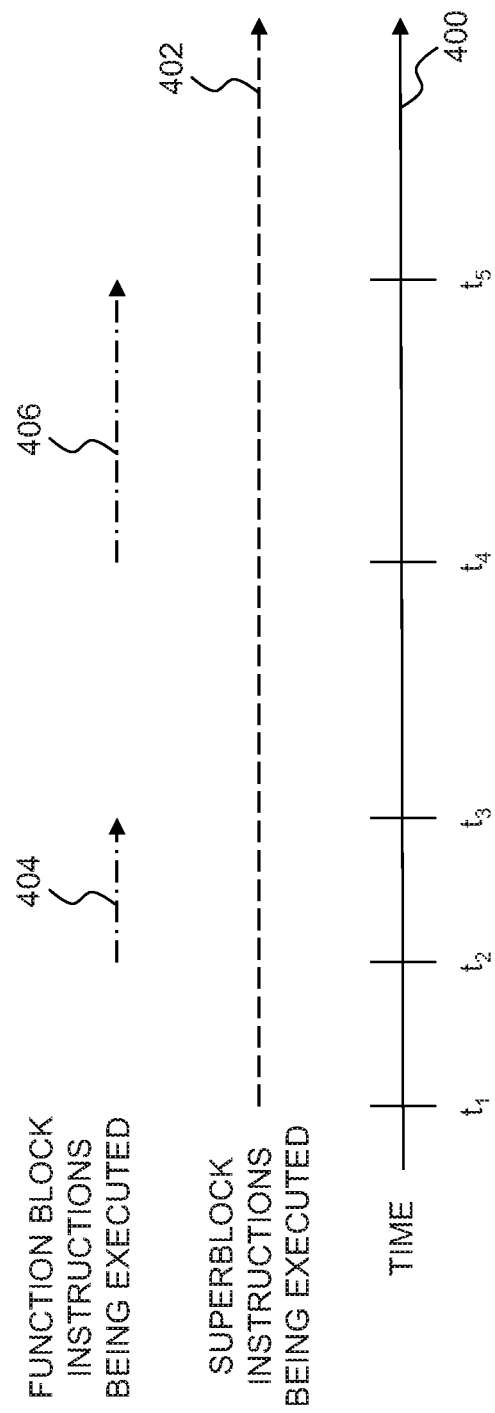
FIG. 4 illustrates one embodiment of a timeline showing the execution of superblock and function block instructions.

Referring to FIG. 4, one embodiment of a timeline 400 illustrates the simultaneous operation of the superblock 104 and function block 200 when the instructions of the function block 200 are being executed to provide one or more services to the superblock application. The timeline 400 moves from left to right and includes five specific times $t_1$-$t_5$. At time $t_1$, the superblock instructions (as indicated by line 402) are being executed, but the function block 200 instructions are not. In other words, the superblock application is in use and has not called the function block API to provide any services. It is understood that the function block 200 may be in a waiting state at time $t_1$ and instructions of the function block 200 may be executed to maintain the waiting state, but the function block 200 is not actively providing services.

At time $t_2$, the superblock application calls the function block API or an external service contacts the function block 200, and the function block 200 instructions (as indicated by line 404) are executed to provide the service requested by the API call or handle the contact from the external service 204. The instructions for the superblock 104 and function block 200 are executed from time $t_2$ until time $t_3$, at which time the function block 200 is no longer needed and is shut down (although this may include going into the waiting state for purposes of example). The superblock instructions are executed from time $t_3$ until time $t_4$, at which time the function block 200 is again called (as indicated by line 406). The instructions for the superblock 104 and function block 200 are executed from time $t_4$ until time $t_5$, at which time the function block 200 is no longer needed and is shut down (although this may include going into the waiting state for purposes of example) while the superblock instructions continue being executed.

Accordingly, while two different applications on a mobile device would not typically execute concurrently, the execution of the instructions for the superblock 104 and function block 200 as shown in FIG. 4 allows the function block 200 to provide additional capabilities to the superblock 104 through the use of API calls. By providing an interface for the function block 200 such as an API, the instructions of the superblock 104 may require minimal modification to access the capabilities provided by the function block 200.

Figure 5:
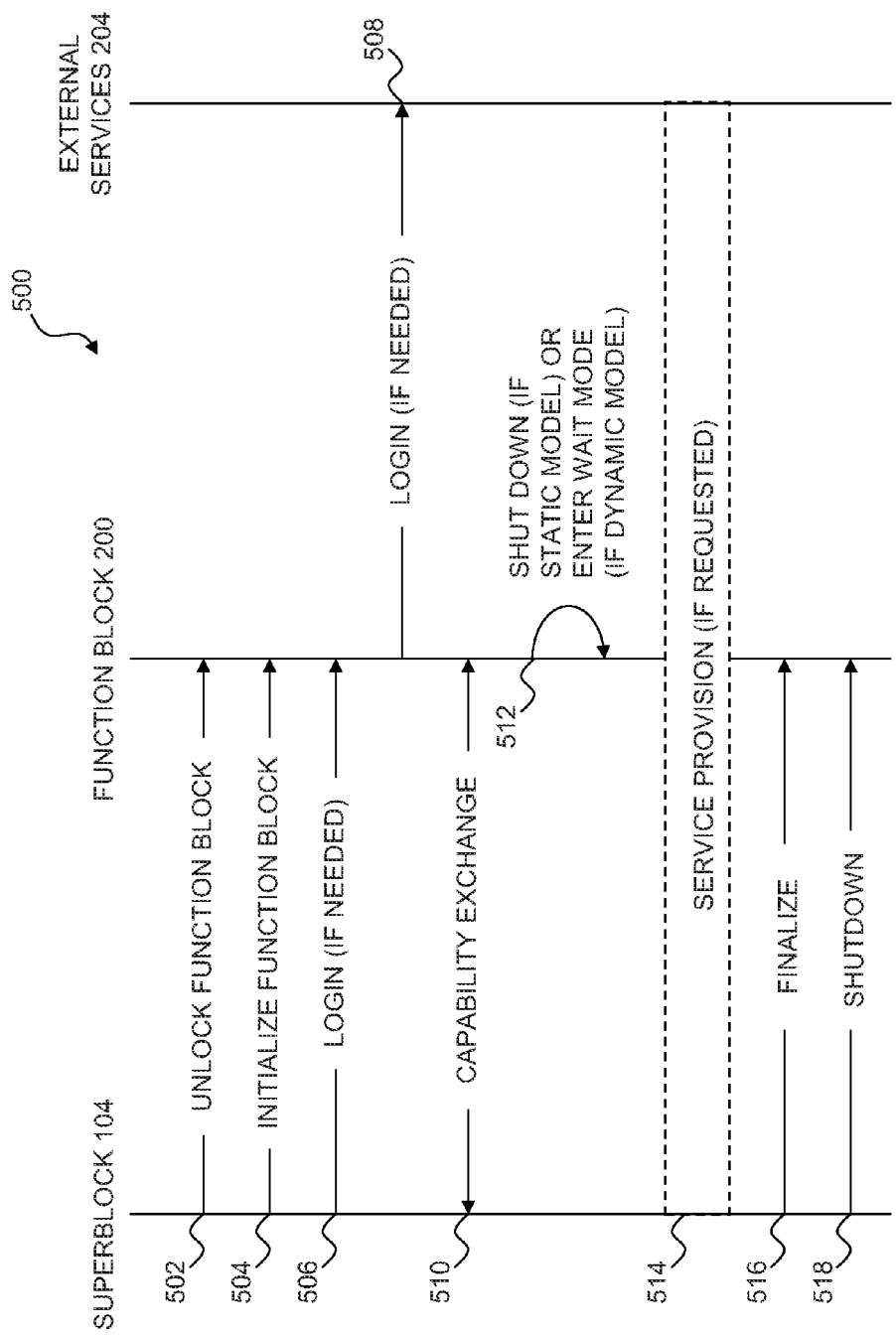
FIG. 5 illustrates a sequence diagram of one embodiment of a process that may be executed to access the functionality provided by the function block of FIG. 2.

Referring to FIG. 5, a sequence diagram 500 illustrates one embodiment of a process that may be executed to access the functionality provided by the function block 200. The superblock 104 may use the function block 200 under a static model or a dynamic model. In the static model, the superblock 104 calls for a specific function (e.g., video), the function block 200 provides the requested function (if available), the superblock 104 consumes the services provided, and the function block 200 is shut down. In the dynamic model, the function block 200 may enter a waiting state and wait for a request from the superblock 104 and/or a request or another event trigger from the external services 204 (e.g., an incoming call, email, or file transfer), handle the request, and then resume the waiting state.

In step 502, the superblock 104 unlocks the function block 200. For example, the unlock process may indicate that the superblock 104 is authorized to unlock some or all of the functionality provided by the function block 200 by providing a key or other authorization indicator. This step may not only limit the superblock 104 to authorized functionality, but may also insure that other applications cannot access the function block's capabilities. In step 504, the function block 200 is initialized. It is noted that these steps may occur during initialization of the superblock 104 or may occur later, such as when the superblock 104 calls the function block 200 for a particular function. For example, steps 502 and 504 may occur when the superblock application is launched and may not be repeated while the superblock application remains open, may occur each time the superblock application calls the function block API for a service, may occur only for particular services, may occur for defined periods of time (e.g., the function block 200 may lock every half hour), and/or using other parameters. It is understood that steps 502 and 504 may be reversed in some embodiments.

During initialization or at another time, policies may be applied. For example, a cost policy may require that any available Wi-Fi network is used before a 3G network. A security policy may require that a virtual private network (VPN) be used whenever available. Backgrounding may be selected as an option when available to allow the superblock application to run in the background. Accordingly, the function block 200 may be configured to provide for specific behavior if desired and this behavior may in turn limit or enhance the capabilities of the superblock 104.

In steps 506 and 508, the superblock 104 may provide login information to the function block 200, and the function block 200 may use this information to access the external services 204. For example, if the function block 200 needs authentication credentials to access the external services 204, steps 506 and 508 may be used to gain access to those external services. In some embodiments, steps 506 and/or 508 may be combined with step 502 and the unlocking of the function block 200 may include logging into whatever external services are authorized and/or available.

In step 510, the function block 200 and the superblock 104 may perform a capability exchange. More specifically, the function block 200 may determine whether (1) the function block 200 has a particular capability, (2) whether the function block 200 can render that capability, and (3) whether the superblock 104 can render that capability. For example, the function block 200 may determine that the function block 200 has the capability to capture audio and play that captured audio through a speaker.

Next, the function block 200 may determine whether it can render that capability by checking, for example, to see whether there is an available microphone (mic) input and an available speaker output. If one or both of the mic and speaker are not present, then the function block 200 has the capability to handle the audio, but not the capability to render the audio. The superblock 104 is not involved in this process as it is not needed to render the audio, so the third determination may not be made. Although the superblock 104 is not involved in rendering the audio, it is understood that the superblock 104 may visually represent the audio, such as by means of an icon, one or more control buttons (e.g., play and stop), and/or other visual representations.

In another example, the superblock 104 may desire to display video. Again, the function block 200 may determine that the function block 200 has the capability to handle the video. Next, the function block 200 may determine whether it can render that capability by checking, for example, to see whether there is an available screen. If a screen is not present, then the function block 200 has the capability to handle the video, but not the capability to render the video. In this example, the superblock 104 is involved in this process as it is needed to provide a video window to render the video (e.g., the function block 200 may provide the video data to be rendered and the superblock 104 may place that video data in a video window), so the third determination is made.

By making such determinations, the function block 200 is able to notify the superblock 104 of the available functions. If a function needs the external services 204, lack of a connection may prevent the function block 200 from delivering external services to the superblock 104, but local services may still be provided. It is understood that while a screen, speaker, or other destination (e.g., a sink) may not be available, the function block 200 may handle some services using a secondary sink, such as a memory to which the video or audio is stored for later use.

Figure 6A:
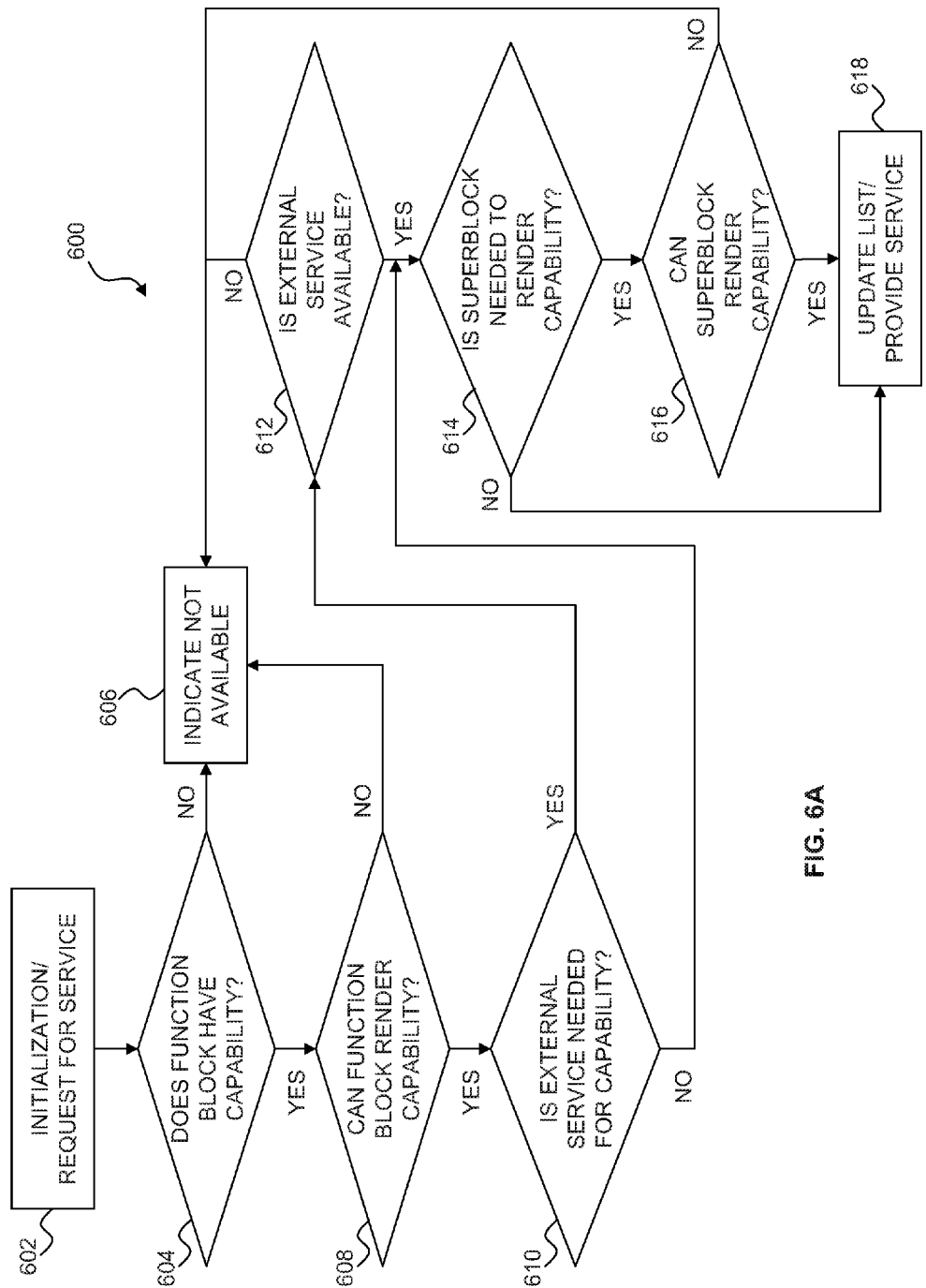
FIG. 6A illustrates a flow chart of one embodiment of a process by which the function block may determine the services that can be provided to the superblock during the process of FIG. 5.

With additional reference to FIG. 6A, a flow chart 600 illustrates one embodiment of a process for the capability exchange of step 510 of FIG. 5. In step 602, the function block 200 may be initialized (in embodiments where the capability exchange is performed on initialization) or the function block 200 may receive a request for service (in embodiments wherein the capability exchange occurs when a service is requested).

In step 604, a determination is made as to whether the function block 200 has the particular capability. For example, whether the function block 200 has the capability to support an audio/video call. If the determination of step 604 is that the function block 200 does not have the particular capability, the method 600 moves to step 606 and the capability is indicated as not being available. It is noted that if a particular capability has not been unlocked, the function block 200 may indicate the capability is not available even if the function block 200 can actually provide the capability. If the determination of step 604 is that the function block 200 does have the particular capability, the method 600 moves to step 608.

In step 608, a determination is made as to whether the function block 200 can render the capability as described previously. This step may determine whether the device 100 supports the needed functionality (e.g., has a microphone if audio input is needed or a speaker if audio output is needed). If the determination of step 608 is that the function block 200 cannot render the capability, the method 600 moves to step 606 and the capability is indicated as not being available. If the determination of step 608 is that the function block 200 does have the capability, the method 600 moves to step 610.

In step 610, a determination is made as to whether an external service 204 is needed to provide the capability. If the determination of step 610 is that an external service 204 is not needed, the method 600 moves to step 614. If the determination of step 610 is that an external service 204 is needed, the method 600 moves to step 612.

In step 612, a determination is made as to whether a needed external service 204 is available. For example, the external service 204 may be offline (e.g., a server used to provide the service may be non-responsive or the device 100 may have minimal or no network connectivity). This step may also determine whether the superblock application is authorized to access the external service 204 (e.g., whether the external service will allow access by the superblock application). If the determination of step 612 is that the needed external service 204 is not available, the method 600 moves to step 606 and the capability is indicated as not being available. If the determination of step 612 is that the needed external service 204 is available, the method 600 moves to step 614.

In step 614, a determination is made as to whether the superblock 104 is needed to render the capability as described previously. If the determination of step 614 is that the superblock 104 is not needed to render the capability, the method 600 moves to step 618 and the service is indicated as available (e.g., a capability list is updated and/or the service is provided). If the determination of step 614 is that the superblock 104 is needed to render the capability, the method 600 moves to step 616.

In step 616, a determination is made as to whether the superblock 104 can render the capability as described previously. If the determination of step 616 is that the superblock 104 cannot render the capability, the method 600 moves to step 606 and the capability is indicated as not being available. If the determination of step 616 is that the superblock 104 does have the capability, the method 600 moves to step 618.

The superblock 104 and/or function block 200 may use a table or other structure for listing available capabilities. For example, a table may identify a particular service, whether the superblock 104 is authorized to access the service, whether the function block 200 can support the service, whether the function block 200 can render the service, whether the superblock 104 is needed to render the service, and whether the superblock 104 can render the service if needed. It is understood that this information may not be provided in detail in all embodiments, but may be condensed to a simple indication of whether the service is available or not. However, by providing additional levels of detail, more useful indicators may be provided. For example, the superblock application may be able to indicate that a particular service is not authorized or that speakers are not available, rather than simply indicating that audio service is not available.

Table 1 illustrates one embodiment of a mapping table that may be used to track the capabilities that the function block 200 can provide to the superblock 104 on the device 100. It is understand that the mapping table may vary for the same function block 200, superblock 104, and device 100 in different scenarios, such as whether the device 100 has network access or not when needed for a particular service. For purposes of illustration, the first column lists services supported by the function block 200, the second column identifies whether that service is supported by the device (e.g., whether the function block 200 can render the service), the third column identifies whether the superblock application can render the service (if needed), the fourth column identifies whether the external services 204 support the service (if needed), and the fifth column identifies where the superblock application has authorization rights to that service.

In some embodiments, the service column may be limited to services that the superblock application is authorized to access. For example, if function block 200 supports instant messaging but the superblock application 104 is not authorized to use this feature, the service may or may not show up in the mapping table depending on the particular implementation. An additional column may be used to identify whether a needed external service is currently available or the fourth column may be used to show this information.

TABLE 1

| SERVICE | DEVICE | SUPERBLOCK | EXTERNAL SERVICE | AUTH? |
|---|---|---|---|---|
| In app video from file | Yes | Yes | N/A | Y |
| Audio - local file | Yes | N/A | N/A | Y |
| Audio - streaming | Yes | N/A | Yes | Y |
| Sharing | Yes | Yes | No | Y |
| Instant messaging | Yes | No | Yes | Y |
| Whiteboard | N/A | N/A | N/A | N |

For purposes of example, the first service involves playing a video from a file and is supported by both the device 100 and the superblock 104. The external services 204 are not needed and are marked as not applicable. The second service involves playing a local audio file and is supported by the device 100. The superblock 104 and external services 204 are not needed and are marked as not applicable. The third service involves playing a streaming audio file and is supported by the device 100 and the external services 204. The superblock 104 is not needed and is marked as not applicable. The fourth service involves content sharing and is supported by the device 100 and the superblock 104, but not the external services 204. As the external services 204 are needed for sharing in this example, this service is not available to the superblock application. The fifth service involves instant messaging and is supported by the device 100 and the external services 204, but not the superblock 104.

The sixth service involves a whiteboard, but the superblock 104 is not authorized to access this service, and so the capabilities are not checked. In other embodiments, capabilities for unauthorized services may be checked and, if supported, the superblock application may notify the user that the service is not authorized. In such embodiments, a dialog or other option may appear to allow the user to subscribe or otherwise gain access to the service if allowed.

With additional reference to FIG. 6B, a diagram 630 provides a visual illustration of the process of FIG. 6A from a source/sink perspective. For the function block 200 to successfully bridge a source 632 and a sink 634 to provide a service, both the source 632 and the sink 634 must be present and available to the function block 200 as indicated by lines 636 and 638, respectively. The source 632 may be the superblock 104, the external services 204, and/or a component of the device 100 such as a wireless interface, a microphone, a camera, and/or any other component capable of providing input to the function block 200. The sink 632 may be the superblock 104, the external services 204, and/or a component of the device 100 such as a wireless interface, a speaker, a display screen, and/or any other component capable of receiving output from the function block 200. In some cases, the lack of availability of a sink may result in the use of a dummy sink (e.g., writing audio to memory when there is no available speaker).

It is understood that the source/sink model provided by the source 632 and sink 634 may be viewed as generic. For example, at the device level, the source 632 and sink 634 operate to read/send data. At the network interface level, each side acts as both source/sink because network interfaces allow for read/write simultaneously in most modern devices. In contrast, a microphone is a source and a speaker is a sink. A speaker may serve as a sink for multiple data in some cases, such as if multiple audio sources are mixed into the single speaker. In this scenario, the source for rendering audio data may be a microphone, network audio encoded data, a music file on the device, and/or other sources. The source/sink model can also be considered for service level consumer/producer models. For example, the function block 200 may be viewed as a source for presenting client side capabilities to a server and at the same time may be viewed as a sink for rendering capabilities presented by the server.

With additional reference to FIG. 6C, a diagram 640 provides a more detailed illustration of FIG. 6B. Source 642 is a microphone and the function block 200 is to send the audio captured from the microphone to sink 644 representing an external service 204 (e.g., as outbound audio for a telephone call). For the function block 200 to successfully bridge the source 642 and the sink 644, both the source 642 and the sink 644 must be present and available to the function block 200 as indicated by lines 646 and 648, respectively, and the source 642, sink 644, and function block 200 must be capable of handling the service. If the function block 200 is thought of as providing services via a series of switches, lines 646 and 648 must both be closed to connect the source 642 and sink 644. Accordingly, the process of FIG. 6A may be executed to ensure that the function block 200 can render the audio input and that the connection to the external service is valid (e.g., that the switches can be closed).

In the present example, one or more additional flow layers represented by line 650 may also present. For example, line 650 may represent whether an audio hold exists. If the audio has been placed on hold, the function block 200 will notify the audio pipeline to stop (e.g., the switch will be opened). The audio capture may continue, but it will not be rendered (e.g., sent to the external services represented by sink 644) as the circuit formed by the function block 200 will no longer be complete.

Referring again to FIG. 5, in step 512, the function block 200 may shut down if operating under the static model or may enter a wait mode if operating under the dynamic model. In step 514, the function block 200 may provide one or more services to the superblock 104 if requested by the superblock 104 or an external service 204. It is understood that steps 512 and 514 may repeat any number of times while the superblock application is running. If no services are requested, step 514 would not be executed.

In steps 516 and 518, the superblock 104 may finalize any service requests and shutdown the function block 200. For example, if the superblock application is closing, the superblock 104 may use one or more API calls to the function block 200 to notify the function block 200 that the function block 200 should close any open ports (e.g., with an external service 204) and close down any running processes.

Figure 7:
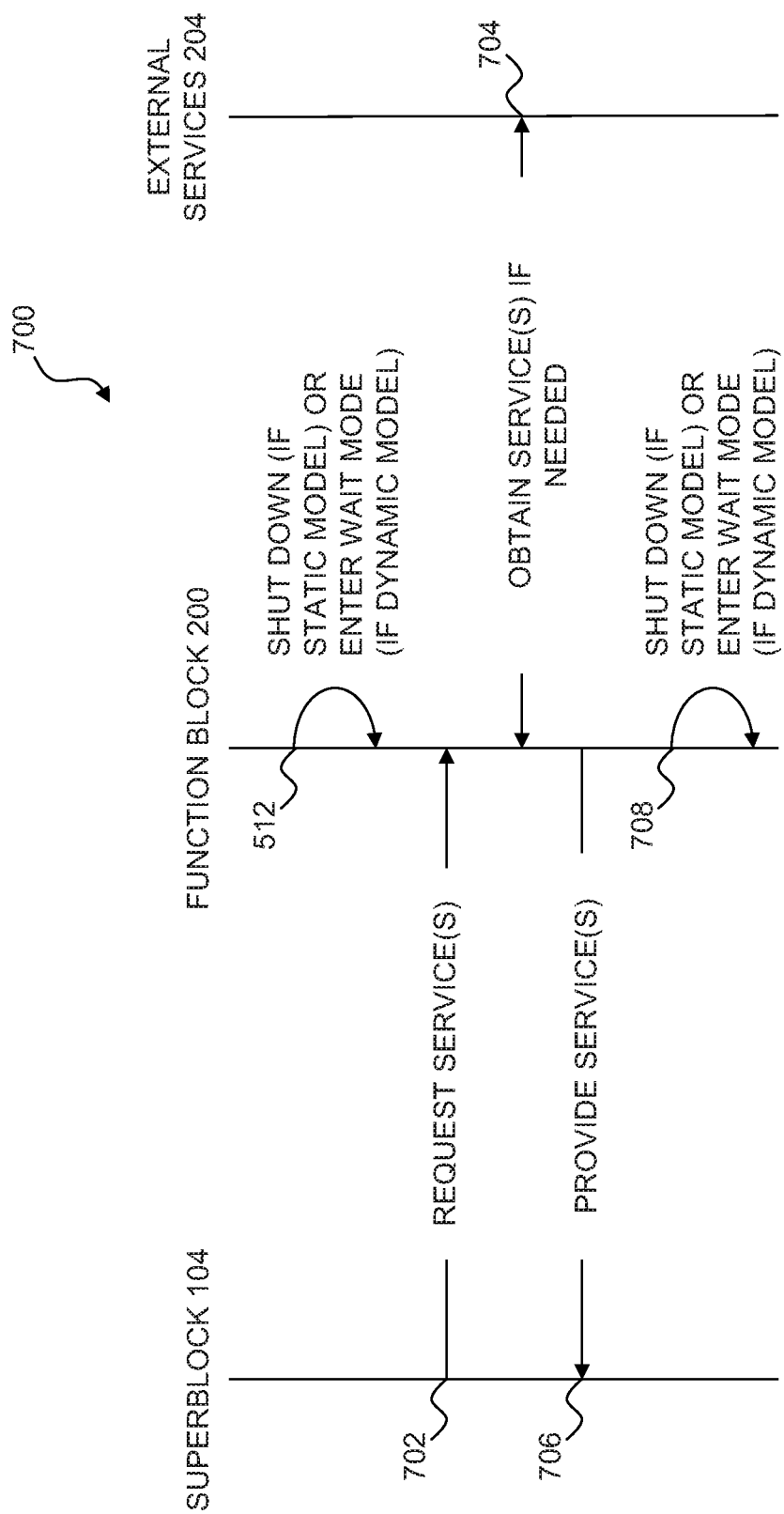
FIG. 7 illustrates a sequence diagram of one embodiment of a process that may be executed by the function block of FIG. 2 to respond to a service request from the superblock.

Referring to FIG. 7, a sequence diagram 700 illustrates one embodiment of a process that may be executed in order to provide a service by the function block 200 in response to a service request by the superblock 104. This present example may operate under either the static model or the dynamic model. The process begins with step 512 of FIG. 5, which is not described in detail in the present example.

In step 702, the superblock 104 issues a request for a service to the function block 200 using an API call or another suitable method. In step 704, the function block 200 obtains any needed support from the external services 204. In step 706, the function block 200 provides the service to the superblock 104. In step 708, the function block 200 may repeat step 512 and either shut down or enter the wait mode depending on whether the function block 200 is operating under the static model or the dynamic model.

Figure 8:
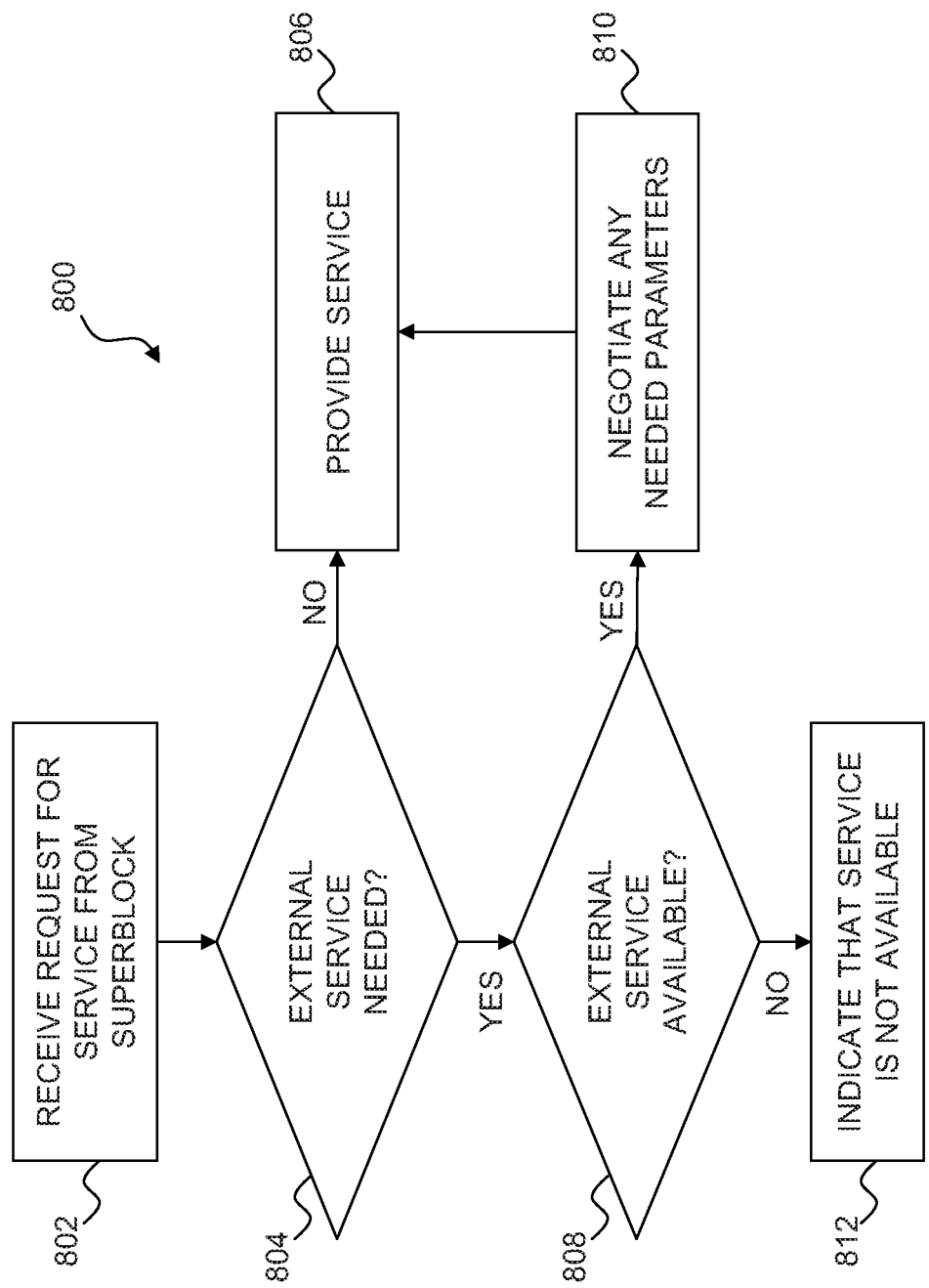
FIG. 8 illustrates a flow chart of one embodiment of a process by which the function block may determine whether to provide external services in responding to the service request of FIG. 7.

Referring to FIG. 8, a flow chart 800 illustrates one embodiment of a process for accessing an external service 204, such as may occur with respect to step 704 of FIG. 7. In step 802, the function block 200 receives a request from the superblock 104 (as occurs in step 702 of FIG. 7). In step 804, a determination is made as to whether the function block 200 needs to use an external service to handle the request. If the determination of step 804 indicates that no external service is needed, the method 800 moves to step 806. In step 806, the service is provided by the function block 200. If the determination of step 804 indicates that an external service is needed, the method 800 moves to step 808.

In step 808, a determination is made as to whether the external service is available. If the determination of step 808 indicates that the external service is available, the method 800 moves to step 810, where any parameters needed for communications and/or service provision may be negotiated between the function block 200 and external service 204. Such parameters may include both signaling and media parameters such as bandwidth, codecs, and/or similar information, and would typically depend on the particular service.

The method 800 then moves to step 806 where the service is provided by the function block 200. If the determination of step 808 indicates that the external service is not available, the method 800 moves to step 812. In step 812, the function block 200 may indicate that the service is not available. For example, the function block 200 may indicate that the server is not responding or that there is no network connectivity for the device 100.

Figure 9:
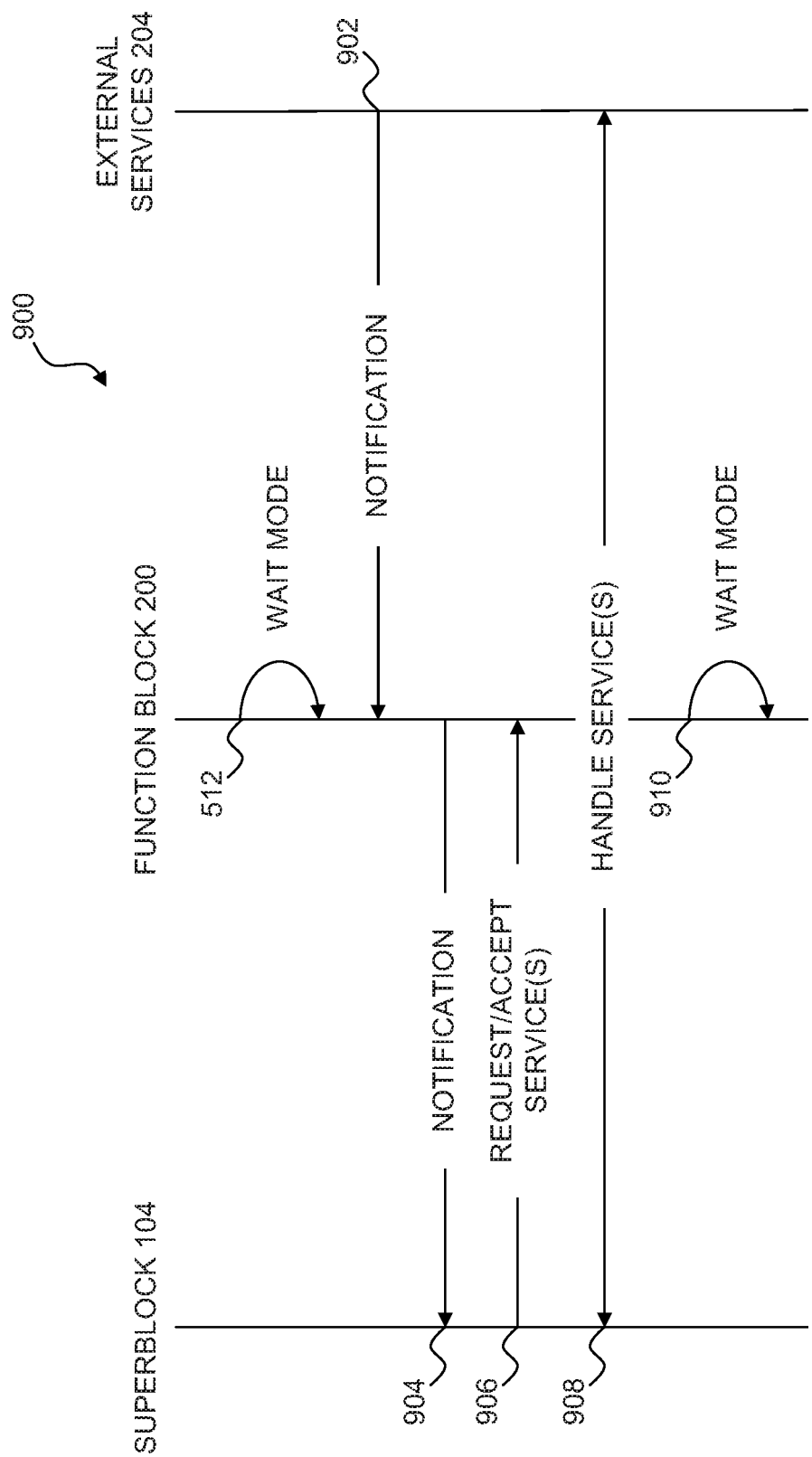
FIG. 9 illustrates a sequence diagram of one embodiment of a process that may be executed by the function block of FIG. 2 to respond to a notification from an external service.

Referring to FIG. 9, a sequence diagram 900 illustrates one embodiment of a process that may be executed in order to provide a service by the function block 200 in response to a notification from an external service 204. This present example may operate under the dynamic model as the function block 200 is in listening mode to receive notifications from the external services 204. The process begins with step 512 of FIG. 5, which is not described in detail in the present example.

In step 902, an external service 204 issues a notification to the function block 200 that the external service 204 has something for the superblock 104. In step 904, the function block 200 may pass the notification to the superblock 104. It is understood that step 904 may not actually pass on the notification, but that the notification of step 902 may trigger functionality within the function block 200 that serves to notify the superblock 104. For example, if the notification of step 902 is about an incoming phone call, the function block 200 may receive the notification, initiate a phone response display (e.g., a display with options for accepting or rejecting the call), and provide the information to the superblock 104 in that manner. In another example, the notification of step 902 may be a presence change (e.g., a user changes status from offline to online), and the function block 200 may update a presence indicator within the superblock application's display. In still another example, the function block 200 may use an event system and send event notifications to the superblock 104. Accordingly, some notifications may require action on the part of a user of the superblock application, while other notifications may not.

In the present example, the notification requires a response and the superblock 104 responds in step 906 by requesting and/or accepting the service (e.g., a phone call). In step 908, the function block 200 handles services between the superblock 104 and the external service 204. In other words, the function block 200 serves as an interface between the external service 204 and the superblock 104. For example, the function block 200 may bridge the phone call, handle call waiting and other call features, and otherwise provide support for the superblock application. In step 910, the function block 200 may enter wait mode after the services have been provided.

Figure 10:
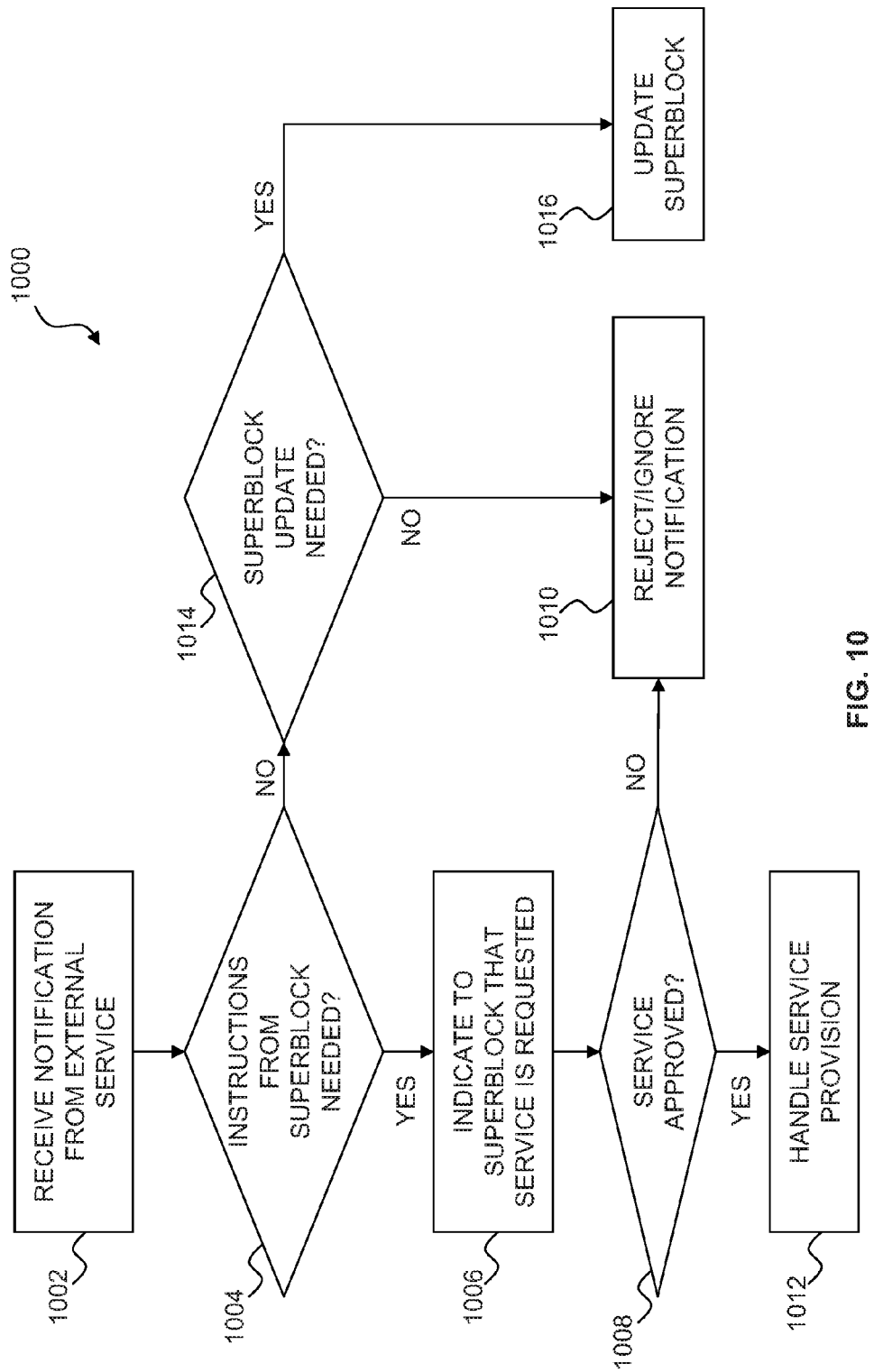
FIG. 10 illustrates a flow chart of one embodiment of a process by which the function block may determine how to handle the notification of FIG. 9.

Referring to FIG. 10, a flow chart 1000 illustrates one embodiment of a process for execution by the function block 200 with respect to an external service 204, such as may occur with respect to FIG. 9. In step 1002, the function block 200 receives a notification from the external service 204. In step 1004, a determination is made as to whether the function block 200 needs instructions from the superblock 104. If the determination of step 1004 indicates that instructions are needed, the method 1000 moves to step 1006. In step 1006, the function block 200 indicates to the superblock 104 that service is requested. The method 1000 then moves to step 1008.

In step 1008, a determination is made as to whether the service request has been approved by the superblock 104. If the determination of step 1008 indicates that the request has not been approved, the method 1000 moves to step 1010, where the notification may be rejected, ignored, or otherwise handled. It is understood that the actual response of the function block 200 in step 1010 may vary depending on the notification type. For example, the function block 200 may indicate to the external service 204 that the call is rejected. If the determination of step 1008 indicates that the request has been approved, the method 1000 moves to step 1012, where the function block 200 may handle the service provision.

Returning to step 1004, if the determination of step 1004 indicates that instructions are not needed, the method 1000 moves to step 1014. In step 1014, a determination is made as to whether the superblock 104 is to be updated based on the notification. If the determination of step 1014 indicates that the superblock 104 is not to be updated, the method 1000 moves to step 1010, where the notification may be rejected, ignored, or otherwise handled. If the determination of step 1014 indicates that the superblock 104 is to be updated, the method 1000 moves to step 1016, where the update may be performed. For example, another user's presence status may be updated from online to offline or vice versa.

Referring again to FIG. 1, embodiments of the device 100 include cellular telephones (including smart phones), personal digital assistants (PDAs), netbooks, tablets, laptops, desktops, workstations, telepresence consoles, and any other computing device that can communicate with another computing device using a wireless and/or wireline communication link. Such communications may be direct (e.g., via a peer-to-peer network, an ad hoc network, or using a direct connection), indirect, such as through a server or other proxy (e.g., in a client-server model), or may use a combination of direct and indirect communications. Although not shown, in other embodiments, the device 100 may be an application specific integrated circuit (ASIC), a processor, or another device within which the function block 200 may be embedded. In some embodiments, external access may not be needed. Accordingly, the function block 200 may be implemented in many different ways and in many different types of systems, and may be customized as needed to operate within a particular environment.

Figure 11:
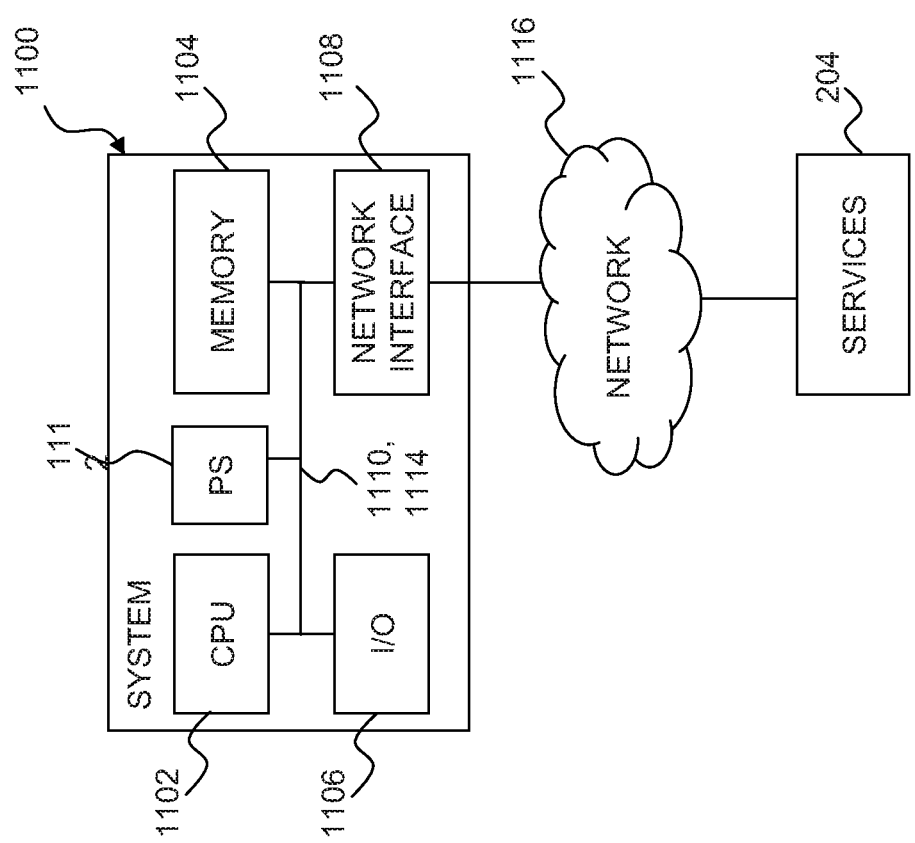
FIG. 11 illustrates one embodiment of a system that may be used for the device of FIG. 1.

Referring to FIG. 11, one embodiment of a system 1100 is illustrated. The system 1100 is one possible example of a device such as the device 100 of FIG. 1. The system 1100 may include a controller (e.g., a central processing unit ("CPU")) 1102, a memory unit 1104, an input/output ("I/O") device 1106, and a network interface 1108. The components 1102, 1104, 1106, and 1108 are interconnected by a transport system (e.g., a bus) 1110. A power supply (PS) 1112 may provide power to components of the computer system 1100, such as the CPU 1102 and memory unit 1104, via a power system 1114 (which is illustrated with the transport system 1110 but may be different). It is understood that the system 1100 may be differently configured and that each of the listed components may actually represent several different components. For example, the CPU 1102 may actually represent a multi-processor or a distributed processing system; the memory unit 1104 may include different levels of cache memory, main memory, hard disks, and remote storage locations; the I/O device 1106 may include monitors, keyboards, and the like; and the network interface 1108 may include one or more network cards providing one or more wired and/or wireless connections to a network 1116. Therefore, a wide range of flexibility is anticipated in the configuration of the computer system 1100.

The system 1100 may use any operating system (or multiple operating systems), including various versions of operating systems provided by Microsoft (such as WINDOWS), Apple (such as Mac OS X), UNIX, and LINUX, and may include operating systems specifically developed for handheld devices, personal computers, servers, and embedded devices depending on the use of the system 1100. The operating system, as well as other instructions (e.g., for the superblock 104 and function block 1100), may be stored in the memory unit 1104 and executed by the processor 1102. For example, if the system 1100 is the device 100, the memory unit 1104 may include instructions for performing some or all of the message sequences and methods described herein.

Figure 12:
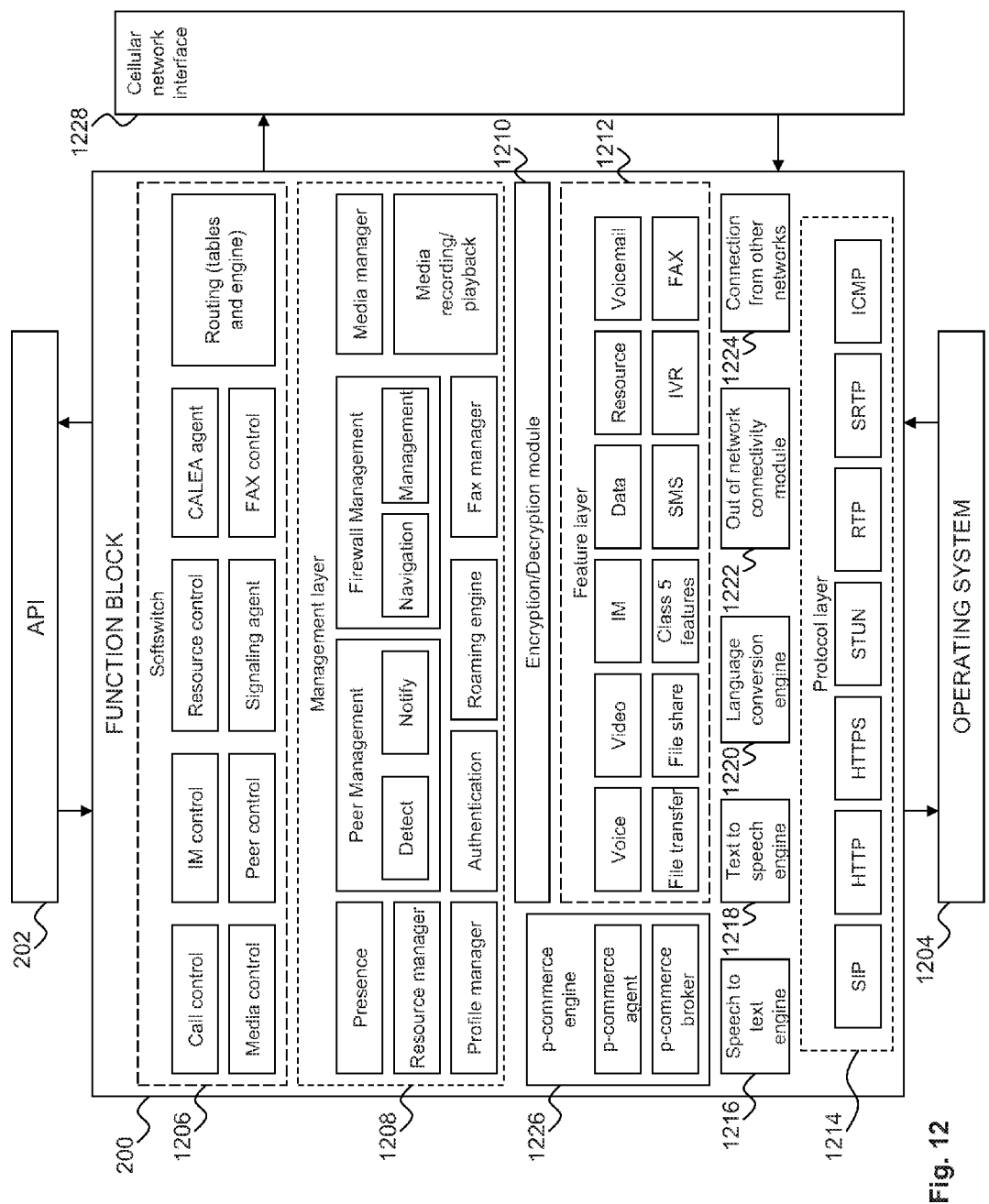
FIG. 12 illustrates one embodiment of the function block of FIG. 2.

Referring to FIG. 12, in one embodiment, the function block 200 may contain functionality similar to that of an endpoint as described in detail in U.S. Pat. No. 7,656,870, filed on Mar. 15, 2005, and entitled SYSTEM AND METHOD FOR PEER-TO-PEER HYBRID COMMUNICATIONS and hereby incorporated by reference in its entirety. In such an embodiment, the graphical user interface (GUI) of the endpoint may be replaced with the API 202 of FIG. 2, and some functionality may be removed if not needed for a particular implementation of the function block 200. Other functionality that is not necessarily in the described endpoint, such as mobile device management (MDM) functionality, may be included in the function block 200. Accordingly, the basic functionality of the described endpoint may exist as logic embodied in the instruction set of the function block 200.

For purposes of example, the function block 200 may be accessed by the API 202 and may communicate with an operating system 1204 of the device 100 of FIG. 1. The API 202 provides access to the capabilities of the function block 200 for the superblock 104, while the operating system 1204 provides underlying functionality, as is known to those of skill in the art. Although shown as separate from the function block 200 for purposes of illustration, it is understood that the API 202 may be part of the function block 200 in some embodiments.

The function block 200 may include multiple components and layers that support the functionality required to perform the operations requested by the superblock 104. For example, the function block 200 may include a softswitch 1206, a management layer 1208, an encryption/decryption module 1210, a feature layer 1212, a protocol layer 1214, a speech-to-text engine 1216, a text-to-speech engine 1218, a language conversion engine 1220, an out-of-network connectivity module 1222, a connection from other networks module 1224, a p-commerce (e.g., peer commerce) engine 1226 that includes a p-commerce agent and a p-commerce broker, and a cellular network interface module 1228.

Each of these components/layers may be further divided into multiple modules. For example, the softswitch 1206 may include a call control module, an instant messaging (IM) control module, a resource control module, a CALEA (Communications Assistance to Law Enforcement Act) agent, a media control module, a peer control module, a signaling agent, a fax control module, and a routing module.

The management layer 1208 may include modules for presence (i.e., network presence), peer management (detecting peers and notifying peers of being online), firewall management (navigation and management), media management, resource management, profile management, authentication, roaming, fax management, and media playback/recording management.

The encryption/decryption module 1210 may provide encryption for outgoing packets and decryption for incoming packets. In the present example, the encryption/decryption module 1210 provides application level encryption at the source, rather than at the network. However, it is understood that the encryption/decryption module 1210 may provide encryption at the network in some embodiments.

The feature layer 1212 may provide support for various features such as voice, video, IM, data, voicemail, file transfer, file sharing, class 5 features, short message service (SMS), interactive voice response (IVR), faxes, and other resources. The protocol layer 1214 may include protocols supported by the function block 200, including SIP, HTTP, HTTPS, STUN, RTP, SRTP, and ICMP. It is understood that these are examples only, and that fewer or more protocols may be supported.

The speech-to-text engine 1216 converts speech received by the function block 200 (e.g., via a microphone or network) into text, the text-to-speech engine 1218 converts text received by the function block 200 into speech (e.g., for output via a speaker), and the language conversion engine 1220 may be configured to convert inbound or outbound information (text or speech) from one language to another language. The out-of-network connectivity module 1222 may be used to handle connections between the function block 200 and the external services 204, and the connection from other networks module 1224 handles incoming connection attempts from the external services 204. The cellular network interface module 1228 may be used to interact with a wireless network.

While the preceding description shows and describes one or more embodiments, it will be understood by those skilled in the art that various changes in form and detail may be made therein without departing from the spirit and scope of the present disclosure. For example, various steps illustrated within a particular flow chart or sequence diagram may be combined or further divided. In addition, steps described in one flow chart or diagram may be incorporated into another flow chart or diagram. Furthermore, the described functionality may be provided by hardware and/or software, and may be distributed or combined into a single platform. Additionally, functionality described in a particular example may be achieved in a manner different than that illustrated, but is still encompassed within the present disclosure. Therefore, the claims should be interpreted in a broad manner, consistent with the present disclosure.

What is claimed is:

1. A mobile device comprising:
a network interface;
a processor coupled to the network interface; and
a memory coupled to the processor and configured to store a plurality of instructions executable by the processor, the instructions including instructions for:
receiving, by a function block stored in the memory of the mobile device, a request for an audio/video (A/V) service from a superblock application stored in the memory of the mobile device;
determining, by the function block, that the superblock application is authorized to access A/V service functionality provided by the function block;
determining, by the function block, that the A/V service requires access to a resource that is external to the mobile device;
establishing, by the function block, the A/V service between the superblock application and the resource via the network interface, wherein the establishing is not supported by the superblock application;
providing, by the function block, video output for the A/V service to a video window within a display window of the superblock application on the mobile device, wherein the video window is displayed simultaneously with the display window of the superblock application on a screen of the mobile device; and
providing, by the function block, audio for the A/V service via the mobile device.

2. The mobile device of claim 1 wherein providing the A/V service includes operating, by the function block, as a bridge between the superblock application and the external device.

3. The mobile device of claim 1 wherein the request is an application programming interface (API) call from the superblock application to the function block.

4. The mobile device of claim 1 wherein the instructions further include initializing the function block, by the superblock application, when the superblock application is loaded into the memory and executed.

5. The mobile device of claim 1 wherein the instructions further include determining, by the function block, that the superblock application is authorized to access functionality provided by the function block for the A/V service.

6. The mobile device of claim 1 wherein the instructions further include providing at least one configuration parameter for the function block, wherein the configuration parameter enables the function block to be configured after the function block is distributed as part of the superblock application.

7. A mobile device comprising:
a network interface;
a processor coupled to the network interface; and
a memory coupled to the processor and configured to store a plurality of instructions executable by the processor, the instructions including instructions for:
receiving, by a function block stored in the memory of the mobile device, a request from an external device for a communication session with a superblock application that is stored in the memory of the mobile device, wherein the function block is configured to provide functionality for the communication session to the superblock application;
notifying, by the function block, the superblock application that the communication session is being requested by the external device;
establishing by the function block a connection with the external device via the network interface to support the communication session; and
providing, by the function block, the communication session to the superblock application, wherein the steps of receiving, notifying, establishing, and providing are performed without switching context from the superblock application to another application on the mobile device.

8. The mobile device of claim 7 wherein the instructions further include determining, by the function block, whether the function block has a capability to perform any rendering needed by the communication session.

9. The mobile device of claim 7 wherein the instructions further include determining, by the function block, whether the superblock has a capability to perform any rendering needed by the communication session.

10. The mobile device of claim 7 wherein the instructions further include determining, by the function block, that the superblock application is authorized to access functionality provided by the function block for the communication session.

11. The mobile device of claim 7 wherein the function block and the superblock application communicate via an application programming interface (API) provided by the function block.

12. A method comprising:
receiving, by a function block stored in a memory of a mobile device, a request from an external device for a communication session with a superblock application that is stored in the memory of the mobile device, wherein the function block is configured to provide functionality for the communication session to the superblock application;
notifying, by the function block, the superblock application that the communication session is being requested by the external device;
establishing, by the function block, a connection with the external device via a network interface of the mobile device to support the communication session; and
providing, by the function block, the communication session to the superblock application, wherein the steps of receiving, notifying, establishing, and providing are performed without switching context from the superblock application to another application on the mobile device.

13. The method of claim 12 wherein providing the communication session includes operating, by the function block, as a bridge between the superblock application and the external device.

14. The method of claim 12 wherein the request is an application programming interface (API) call from the superblock application to the function block.

15. The method of claim 12 further comprising determining, by the function block, whether the function block has a capability to provide the communication session.

16. The method of claim 12 further comprising determining, by the function block, whether the function block has a capability to perform any rendering needed by the communication session.

17. The method of claim 12 further comprising determining, by the function block, whether the superblock has a capability to perform any rendering needed by the communication session.

18. The method of claim 12 further comprising initializing the function block, by the superblock application when the superblock application is loaded into the memory and executed.

19. The method of claim 12 further comprising determining, by the function block, that the superblock application is authorized to access functionality provided by the function block for the communication session.

20. The method of claim 12 further comprising providing at least one configuration parameter for the function block, wherein the configuration parameter enables the function block to be configured after the function block is distributed as part of the superblock application.

* * * * *